United States Patent
Kaneiwa et al.

(10) Patent No.: US 8,477,423 B2
(45) Date of Patent: Jul. 2, 2013

(54) METHOD OF PRODUCING A PATTERNED BIREFRINGENT PRODUCT

(75) Inventors: Hideki Kaneiwa, Minami-ashigara (JP); Ichiro Amimori, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 390 days.

(21) Appl. No.: 12/863,278

(22) PCT Filed: Jan. 19, 2009

(86) PCT No.: PCT/JP2009/051135
§ 371 (c)(1),
(2), (4) Date: Jul. 16, 2010

(87) PCT Pub. No.: WO2009/093718
PCT Pub. Date: Jul. 30, 2009

(65) Prior Publication Data
US 2011/0043911 A1    Feb. 24, 2011

(30) Foreign Application Priority Data

Jan. 22, 2008    (JP) ................. 2008-011170

(51) Int. Cl.
*G02B 5/30* (2006.01)
(52) U.S. Cl.
USPC ...................... 359/489.06; 359/900
(58) Field of Classification Search
USPC ................. 359/489.01, 489.06, 900
See application file for complete search history.

(56) References Cited

U.S. PATENT DOCUMENTS

| 6,519,016 | B1 | 2/2003 | Ichihashi et al. |
| 2003/0137620 | A1 | 7/2003 | Wang et al. |
| 2007/0077502 | A1 | 4/2007 | Moriya |

FOREIGN PATENT DOCUMENTS

| EP | 1 286 188 A2 | 2/2003 |
| EP | 1 295 929 A2 | 3/2003 |
| EP | 1 925 954 A2 | 5/2008 |
| GB | 2 394 718 A | 5/2004 |
| JP | 3-141320 A | 6/1991 |
| JP | 9-183287 A | 7/1997 |
| JP | 2003-131187 A | 5/2003 |
| JP | 2006-9030 A | 1/2006 |
| JP | 2006-526165 | 11/2006 |
| JP | 2008-175916 A | 7/2008 |
| JP | 2009-69793 A | 4/2009 |
| WO | WO 2004/083913 A | 9/2004 |

OTHER PUBLICATIONS

Office Action from State Intellectual property Office (SIPO) of the People's Republic of China in corresponding Chinese Patent Application No. 200980110128.0 dated Dec. 16, 2012, with an English translation.
International Search Report (PCT/ISA/210) for PCT/JP2009/051135 dated Jul. 23, 2009.
Written Opinion (PCT/ISA/237) for PCT/JP2009/051135 dated Jul. 23, 2009.

(Continued)

*Primary Examiner* — Jack Dinh
(74) *Attorney, Agent, or Firm* — Buchanan Ingersoll & Rooney PC

(57) ABSTRACT

A method of producing a patterned birefringent product, containing at least steps (I) to (III) in this order:
(I) providing a birefringent pattern builder having an optically anisotropic layer containing a polymer;
(II) subjecting two or more regions of the birefringent pattern builder to exposure to light under exposure conditions different from each other; and
(III) heating a laminated structure obtained after the step (II) at 50° C. or higher and 400° C. or lower.

11 Claims, 7 Drawing Sheets

OTHER PUBLICATIONS

C. Doornkamp et al., "Late-News Poster: Novel Transflective LCD with Ultra-wide Viewing Angle," 2004 SID International Symposium Digest of Technical Papers, May 25-27, 2004, vol. 35, No. 1, 4 pages.

B. Van Der Zande et al., "Synthesis, Properties, and Photopolymerization of Liquid-Crystalline Oxetanes: Application in Transflective Liquid-Crystal Displays," Advanced Functional Materials, 2006, pp. 791-798, vol. 16.

Official Communication from European Patent Office issued in corresponding European Patent Application No. 09 704 507.4 dated Oct. 4, 2011.

Office Action issued in corresponding Japanese Application No. 2008-011170 dated Sep. 11, 2012.

METHOD OF PRODUCING A PATTERNED BIREFRINGENT PRODUCT

TECHNICAL FIELD

The present invention relates to a method of producing a patterned birefringent product and to a patterned birefringent product produced by said method.

BACKGROUND ART

There are proposed several methods of producing birefringence patterns. JP-A-3-141320 ("JP-A" means unexamined published Japanese patent application) discloses use of a patterned birefringent product possibly visualized as it is held between two polarization plates in a method of recording an image. In JP-A-3-141320, use is made of a technique using a heat mode laser or thermal head to apply heat to the image-forming portion of an anisotropic film, thereby completely or partially reducing the anisotropy.

However, patterns produced by techniques in which birefringence is reduced with heat, as set forth above, all have the drawback of poor heat resistance. That is, there is a risk that when heat is applied to a portion in which birefringence remains, the birefringence of that portion will end up decreasing. Further, in techniques employing thermal heads or the like, since it is difficult to impart difference between the thermal conductivity in the direction of thickness and the thermal conductivity in the in-surface direction, it is extremely difficult to create a pattern at a resolution lower than the thickness of the film. Heating with a laser permits the creation of high-resolution patterns, but there is a problem in that the drawing of fine patterns by scanning with a laser is time-consuming.

JP-A-3-141320 also proposes the technique of lowering the birefringence by using a photodecomposing photopolymer or a photoisomerizing polymer with light. However, the resistance to light of the pattern that is produced by this technique is low, rendering the pattern unsuitable as a birefringence pattern for use in optical elements in particular.

Another technique for producing birefringence patterns has been proposed in the form of the method of applying a coating liquid comprising polymerizable liquid crystals and a polymerization initiator on a support having an alignment film, conducting patterned exposure through a photomask to the coating liquid wherein the liquid crystals are in an aligned state, fixing the alignment of exposed regions by polymerization, applying heat to create an isotropic phase in unexposed regions, and conducting exposure a second time to cause only those regions exposed the first time around to exhibit optical anisotropy (see British Patent No. 2,394,718A, and "Advanced Function Materials", pp. 791-798, 16, 2006). However, in this method, controlling the state of alignment of the liquid crystals prior to fixation requires conducting multiple exposures while carefully controlling the temperature of the overall system, presenting a problem in the form of a demanding manufacturing process.

SUMMARY OF INVENTION

The present invention is to contemplate for providing a method useful in facile production of a high-resolution and high-heat-resistance patterned birefringent product, i.e. an article having patterned birefringence and being high in resolution and in heat-resistance.

According to the present invention, there is provided the following means:

(1) A method of producing a patterned birefringent product, comprising at least steps (I) to (III) in this order:
(I) providing a birefringent pattern builder having an optically anisotropic layer containing a polymer;
(II) subjecting two or more regions of the birefringent pattern builder to exposure to light under exposure conditions different from each other; and
(III) heating a laminated structure obtained after the step (II) at 50° C. or higher and 400° C. or lower.

(2) The method according to the above (1), wherein the exposure conditions are different in at least one exposure parameter selected from the group consisting of exposure intensity, exposure quantity, exposure time period, and exposure peak wavelength.

(3) The method according to the above (1) or (2), wherein the exposure of two or more regions is performed by using an exposure mask having patterns different from each other.

(4) The method according to the above (1), wherein the step (II) is carried out by single exposure by using an exposure mask having two or more regions showing transmission spectra different from each other.

(5) The method according to any one of the above (1) to (4), wherein the in-plane retardation at 20° C. of the optically anisotropic layer is 10 nm or more.

(6) The method according to any one of the above (1) to (5), wherein the polymer has an unreacted reactive group.

(7) The method according to any one of the above (1) to (6), wherein the optically anisotropic layer is a layer formed by coating with a solution containing a liquid crystalline compound having at least one reactive group, drying the thus-coated solution to thereby form a liquid crystal phase, and then applying heat or irradiating ionized radiation to the liquid crystal phase to thereby cause polymerization and fixation.

(8) The method according to the above (7), wherein the liquid crystalline compound has two or more types of reactive groups each of which has different polymerization condition.

(9) The method according to the above (8), wherein the liquid crystalline compound at least has a radically reactive group and a cationically reactive group.

(10) The method according to the above (9), wherein the radically reactive group is an acrylic group and/or a methacrylic group, and the cationically reactive group is a vinyl ether group, an oxetanyl group, and/or an epoxy group.

(11) The method according to any one of the above (1) to (6), wherein the optically anisotropic layer is a stretched film.

(12) The method according to any one of the above (1) to (11), wherein the step is carried out by conducting transfer of a transferring material which has the optically anisotropic layer (which material may be referred to simply as "transferring material" hereinafter), to a target transfer material (which is a target material on which the transfer of the transferring material is to be conducted).

(13) A product, which is obtainable from the method according to any one of the above (1) to (12), wherein the change in retardation (phase difference) thereof after baking at 200° C. for 30 minutes is 10% or less.

(14) A product used as mean of preventing forgery, which is obtainable from the method according to any one of the above (1) to (12).

(15) A product used as an optical element, which is obtainable from the method according to any one of the above (1) to (12).

ADVANTAGEOUS EFFECTS OF INVENTION

By the method of the present invention and the builder according to the present invention, a patterned birefringent product high in resolution and heat-resistance can be obtained. The birefringence pattern is readily pattern-identifiable when observed through a polarizing plate, whereas it is almost transparent and colorless when observed through no polarizing plate, and the birefringence pattern is effective for preventing forgery and for imparting visual effects. In particular, it is possible to reduce the number of production steps and thus the production cost if such a transferring material is used.

MODE FOR CARRYING OUT INVENTION

Some examples of preferable modes of the present invention are described below in detail.

In the present specification, "to" denotes a range including numerical values described before and after it as a minimum value and a maximum value.

Herein, in the present specification, the term retardation or Re means an in-plane retardation, and the term $Re(\lambda)$ indicates an in-plane retardation at wavelength $\lambda$ (nm). The in-plane retardation ($Re(\lambda)$) can be measured by making light of wavelength $\lambda$, nm incident in the direction of the normal of the film, in KOBRA 21ADH or WR (each trade name, manufactured by Oji Scientific Instruments). In the present specification, retardation or Re means one measured at wavelength $\lambda$, is 611±5 nm, 545±5 nm and 435±5 nm for R, G, and B, respectively, and denotes one measured at wavelength $\lambda$ 545±5 nm or 590±5 nm unless otherwise specified any of color.

It is to be noted that, regarding angles, the term "substantially" in the context of this specification means that a tolerance of less than ±5° with respect to the precise angles can be allowed. Difference from the precise angles is preferably less than 4°, and more preferably less than 3°. It is also to be noted that, regarding retardation values, the term "substantially" in the context of the specification means that a tolerance of less than ±5% with respect to the precise values can be allowed. It is also to be noted that the term "The Re value is substantially not zero" in the context of the specification means that the Re value is not less than 5 nm. The measurement wavelength for refractive indexes is any visible light wavelength, unless otherwise specified. It is also to be noted that the term "visible light" in the context of the specification means light of a wavelength falling within the range from 400 to 700 nm.

(Birefringence Pattern Builder)

FIGS. 1(a) to 1(i) are schematic sectional views showing several examples of the birefringence pattern builder. The birefringence pattern builder is a material for preparing birefringence pattern, and a material with which the patterned birefringent product can be prepared by conducting the pre-determined steps. The birefringence pattern builder shown in FIG. 1(a) is an example having an optically anisotropic layer 12 on a support (substrate) 11. The birefringence pattern builder shown in FIG. 1(b) is an example having an alignment layer 13. The alignment layer 13 functions as a layer for supporting the alignment/orientation of liquid crystalline compounds, when use is made, as the optically anisotropic layer 12, of a layer formed by coating a substrate with a solution comprising the liquid crystalline compounds and drying the solution to thereby form a liquid crystal phase, and then polymerizing and fixing the compounds by applying heat or irradiating ionized radiation to the liquid crystal phase.

The birefringence pattern builder shown in FIG. 1(c) is an example further having a reflective layer 35 on the support 11. The birefringence pattern builder shown in FIG. 1(d) is an example further having the reflective layer 35 under the support 11. The birefringence pattern builder shown in FIG. 1(e) is an example having a post-adhesive layer 16 (which is a layer functions as an adhesive when attached to a subject 'another product' after peeling off the below-mentioned delamination layer from the resultant laminated structure) and a delamination layer (which is a layer that can be delaminated or peeled off from the laminated structure) 17 under the support 11, in order to be attached to another product after forming the birefringence pattern. The birefringence pattern builder shown in FIG. 1(f) is an example having an adhesive layer 14 for transfer between the support 11 and the optically anisotropic layer 12 due to the fact that it is prepared by using a transferring material. The birefringence pattern builder shown in FIG. 1(g) is an example having plural optically anisotropic layers (12F, 12S). The birefringence pattern builder shown in FIG. 1(h) is an example having a reflective layer 35 under a self-supporting optically anisotropic layer 12. The birefringence pattern builder shown in FIG. 1(i) is an example having the post-adhesive layer 16 and the delamination layer 17 under the reflective layer 35 in order to be attached to another product after forming the birefringence pattern.

(Birefringence Pattern Builder to be Used as Transferring Material)

FIGS. 2(a) to 2(f) are schematic sectional views showing several examples of the birefringence pattern builder that can be used as a transferring material in the present invention. By using the birefringence pattern builder as a transferring material, a birefringence pattern builder having an optically anisotropic layer, a birefringence pattern builder having plural optically anisotropic layers, or a product having plural layers having birefringence pattern, can be readily formed on a desired support.

The birefringence pattern builder shown in FIG. 2(a) is an example having an optically anisotropic layer 12 on a temporary support 21. The birefringence pattern builder shown in FIG. 2(b) is an example further having an adhesive layer 14 for transfer on the optically anisotropic layer 12. The birefringence pattern builder shown in FIG. 2(c) is an example further having a surface-protecting layer 18 on the adhesive layer 14 for transfer. The birefringence pattern builder shown in FIG. 2(d) is an example further having an alignment layer 22 on the temporary support between the temporary support 21 and the optically anisotropic layer 12. The birefringence pattern builder shown in FIG. 2(e) is an example having further a dynamic-property-controlling layer 23 between the temporary support 21 and the alignment layer 22 on the temporary support. The birefringence pattern builder shown in FIG. 2(f) is an example having plural optically anisotropic layers (12F, 12S).

(Patterned Birefringent Product)

Herein, the term "patterned birefringent product" in the present specification means a product having two or more regions different in birefringence. The patterned birefringent product more preferably has three or more regions different in birefringence. The regions having the birefringence equal to each other may be in the continuous or discontinuous state or shape.

FIGS. 3(a) to 3(e) are schematic sectional views showing several examples of the patterned birefringent product which can be obtained by the production method of the present invention using the birefringence pattern builder. The patterned birefringent product obtainable by the method of the present invention has at least one patterned optically anisotropic layer 112. In the present specification, the term "patterned optically anisotropic layer" means "an optically anisotropic layer having regions different in birefringence from each other in a patterned manner".

The patterned birefringent product shown in FIG. 3(a) is an example consisting of only one patterned optically anisotropic layer 112. The patterned birefringent product produced by the method of the present invention has multiple exposed regions exposed under exposure conditions different from each other (a first exposed region 112-A and a second exposed region 112-B in FIG. 3(a)), and the "multiple exposed regions exposed under exposure conditions different from each other" have birefringence different from each other. The patterned birefringent product shown in FIG. 3(b) is an example of the product having multiple exposed regions exposed under different exposure conditions (the first exposed region 112-A and the second exposed region 112-B) as well as an unexposed region 112-N. In that case, the unexposed region 112-N shows a birefringence different from that in any exposed region. The patterned birefringent product shown in FIG. 3(c) is an example having a support 11, and a reflective layer 35, an adhesive layer 14 for transfer, and a patterned optically anisotropic layer 112, each of which is provided on the support in that order from the support.

The patterned birefringent product may have multiple patterned optically anisotropic layers, and thus, can exhibit a variety of additional functions with the multiple optically anisotropic layers. The patterned birefringent product shown in FIG. 3(d) is an example of such a product formed by laminating multiple optically anisotropic layers and then being subjected to a pattern-exposure. Such a product is useful, for example, in producing a pattern containing a region having large retardation that is not possible with only one optically anisotropic layer. The patterned birefringent product shown in FIG. 3(e) is an example of a pattern having multiple optically anisotropic layers formed independently that are produced by repeating "preparation of optically anisotropic layer (including transfer), pattern exposure, and baking" multiple times. Such a configuration is useful, for example, if patterns independent of each other are desirably formed on two or more optically anisotropic layers different in retardation or in direction of slow axis from each other. The pattern exposure under different exposure conditions then may be carried out, as shown in the figure, in combination with pattern exposure under single exposure condition or with plain exposure over the entire surface.

Hereinafter, description will be made in detail on the birefringence pattern builder, the method of producing a patterned birefringent product using the same, materials of the patterned birefringent product, and the method of producing the same. However, it is to be noted that the present invention is not limited to the embodiments below. Any other embodiments can be also carried out referring to the description below and known methods.

(Optically Anisotropic Layer)

The optically anisotropic layer in the birefringence pattern builder is the layer having at least one incident direction, of which retardation (Re) is not substantively zero when a phase difference is measured. In other words, the optically anisotropic layer is the layer which has non-isotropic optical characteristic.

The optically anisotropic layer in the birefringence pattern builder contains polymer. By containing polymer, the optically anisotropic layer can meet various requirements such as birefringence, transparency, solvent-resistance, toughness, and flexibility. The polymer in the optically anisotropic layer is preferred to have an unreacted reactive group. It is because, although light exposure leads to crosslinking of the polymer chain in reaction of unreacted reactive groups, the degree of crosslinking of the polymer chain varies by exposure under different exposure conditions, consequently leading to fluctuation in retardation, thus making it easier to prepare such a patterned birefringent product.

The optically anisotropic layer may be solid at 20° C., preferably at 30° C., and more preferably at 40° C., because an optically anisotropic layer which is solid at 20° C. can readily be applied to another functional layer, or transferred or attached to a support.

In order to be applied with another functional layer, the optically anisotropic layer is preferred to have solvent-resistance. In the specification, "to have solvent-resistance" means that the retardation of the layer after soaked in the subject solvent for two minutes is in the range of 30 to 170%, more preferably 50 to 150%, most preferably 80 to 120%, with respect to the retardation of the layer before the soaking. As the subject solvent, examples include water, methanol, ethanol, isopropanol, acetone, methylethylketone, cyclohexanone, propyleneglycolmonomethyletheracetate, N-methylpyrrolidone, hexane, chloroform, and ethyl acetate. Among them, acetone, methylethylketone, cyclohexanone, propyleneglycolmonomethyletheracetate, and N-methylpyrrolidone are preferable, and methylethylketone, cyclohexanone, and propyleneglycolmonomethyletheracetate, and a mixture thereof are most preferable.

The retardation of the optically anisotropic layer at 20° C. may be 5 nm or more; preferably 10 nm or more and 10,000 nm or less, and more preferably 20 nm or more and 2,000 nm or less. When the retardation is too small, formation of birefringence pattern may become difficult. When the retardation is too large, error becomes larger and it may become difficult to achieve practically needed accuracy.

The production method of the optically anisotropic layer is not particularly limited. Examples include a method of conducting coating a solution comprising a liquid crystalline compound having at least one reactive group and drying the solution to thereby form a liquid crystal phase, and then applying heat or irradiating ionized radiation for polymerization and fixation; a method of stretching a layer formed by polymerizing and fixing a monomer having two or more reactive groups; a method of stretching a layer consisting of polymer after a reactive group is being introduced to the layer by using a coupling agent; and a method of stretching a layer consisting of polymer and then introducing a reactive group to the layer by using a coupling agent.

Further, as explained below, the optically anisotropic layer according to the present invention may be formed by transfer.

The thickness of the optically anisotropic layer is preferably 0.1 to 20 μm, and more preferably 0.5 to 10 μm.

(Optically Anisotropic Layer Formed by Polymerizing and Fixing Composition Comprising Liquid Crystalline Compound)

The production method of the optically anisotropic layer is explained below, wherein coating with a solution comprising a liquid crystalline compound having at least one reactive group is conducted and the solution is dried to thereby form a liquid crystal phase, and then the liquid crystal phase is polymerized and fixed by applying heat or irradiating ionized radiation. In the method, an optically anisotropic layer with an equal retardation, which is thinner than the layer obtained by the after-mentioned method wherein polymer is stretched, can be obtained.

(Liquid-Crystalline Compound)

The liquid-crystalline compounds can generally be classified by molecular geometry into rod-like one and discotic one. Each category further includes low-molecular type and high-molecular type. The high-molecular type generally refers to that having a degree of polymerization of 100 or above ("Kobunshi Butsuri-Soten'i Dainamikusu (Polymer Physics-Phase Transition Dynamics), by Masao Doi, p. 2, published by Iwanami Shoten, Publishers, 1992). Either type of the liquid-crystalline molecule may be used in the present invention, wherein it is preferable to use a rod-like liquid-crystalline compound or a discotic liquid-crystalline compound. A mixture of two or more kinds of rod-like liquid-crystalline compounds, a mixture of two or more kinds of discotic liquid-crystalline compounds, or a mixture of a rod-like liquid-crystalline compound and a discotic liquid-crystalline compound may also be used. It is more preferable that the optically anisotropic layer is formed using a composition comprising the rod-like liquid-crystalline compound or the discotic liquid-crystalline compound, having a reactive group, because such compound can reduce temperature- or moisture-dependent changes, and it is still further preferable that at least one compound in the mixture has two or more reactive groups in a single liquid-crystalline molecule. The liquid-crystalline composition may be a mixture of two or more kinds of compounds, wherein at least one of the compounds preferably has two or more reactive groups.

It is also preferred that liquid-crystalline compound have two or more kinds of reactive groups which have different polymerization condition to each other. In such case, an optically anisotropic layer comprising polymer having unreacted reactive group can be produced by only polymerizing one type of reactive groups among plural types of reactive groups by selecting polymerization condition. The polymerization condition may be wavelength range of the irradiation of ionized radiation, or mechanism of polymerization. Preferably, the condition may be polymerization initiator, which can control polymerization of compound having a combination of a radically polymerizable group and a cationically polymerizable group. The combination of acrylic group and/or methacrylic group as the radically polymerizable group and vinyl ether group, oxetanyl group, and/or epoxy group as the cationically polymerizable group is particularly preferred, because the reactivity can be controlled readily.

Examples of the rod-like liquid-crystalline compound include azomethine compounds, azoxy compounds, cyanobiphenyl compounds, cyanophenyl esters, benzoate esters, cyclohexanecarboxylic acid phenyl esters, cyanophenylcyclohexane compounds, cyano-substituted phenylpyrimidine compounds, alkoxy-substituted phenylpyrimidine compounds, phenyldioxane compounds, tolan compounds, and alkenylcyclohexylbenzonitrile compounds. Not only the low-molecular-weight liquid-crystalline compound as listed in the above, high-molecular-weight liquid-crystalline compound may also be used. High-molecular-weight liquid-crystalline compounds may be obtained by polymerizing low-molecular-weight liquid-crystalline compounds having at least one reactive group. Among such low-molecular-weight liquid-crystalline compounds, liquid-crystalline compounds represented by formula (I) are preferred.

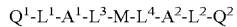  Formula (I)

In formula (I), $Q^1$ and $Q^2$ each independently represent a reactive group; $L^1$, $L^2$, $L^3$ and $L^4$ each independently represent a single bond or a divalent linking group; $A^1$ and $A^2$ each independently represent a spacer group having 2 to 20 carbon atoms; and M represents a mesogen group.

Hereinafter, the rod-shaped liquid crystalline compound having a reactive group represented by Formula (I) will be described in more detail. In formula (I), $Q^1$ and $Q^2$ each independently represent a reactive group. The polymerization reaction of the reactive group is preferably addition polymerization (including ring opening polymerization) or condensation polymerization. In other words, the reactive group is preferably a functional group capable of addition polymerization reaction or condensation polymerization reaction. Examples of reactive groups are shown below.

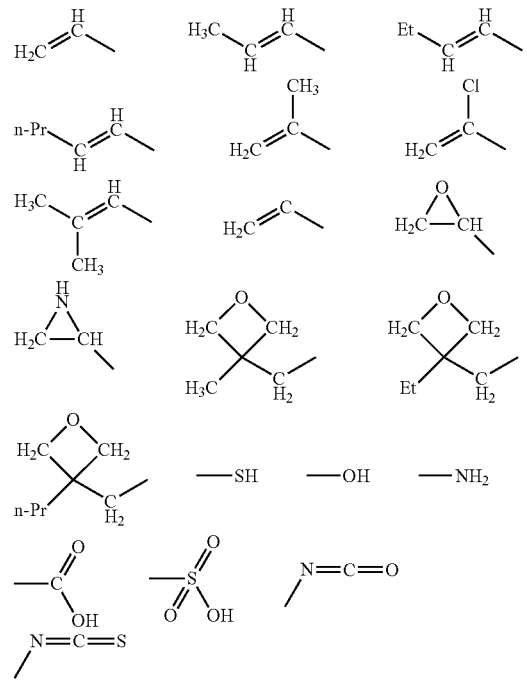

The divalent linking groups represented by $L^1$, $L^2$, $L^3$ and $L^4$ are preferably those selected from the group consisting of —O—, —S—, —CO—, —NR$^2$—, —CO—O—, —O—CO—O—, —CO—NR$^2$—, —NR$^2$—CO—, —O—CO—, —O—CO—NR$^2$—, —NR$^2$—CO—O— and —NR$^2$—CO—NR$^2$—. $R^2$ represents an alkyl group having 2 to 7 carbon atoms or a hydrogen atom. Of the groups represented by a combination of $Q^1$ and $L^1$, or $Q^2$ and $L^2$, $CH_2$=CH—CO—O—, $CH_2$=C($CH_3$)—CO—O—, and $CH_2$=C(Cl)—CO—O— are preferable, and $CH_2$=CH—CO—O— is most preferable.

$A_1$ and $A_2$ each are a spacer group having 2 to 20 carbon atoms, preferably an alkylene, alkenylene or alkynylene group having 2 to 12 carbon atoms; and particularly preferably an alkylene group. The spacer group is more preferably has a chain form, and may contain non-neighboring oxygen atoms or sulfur atoms. The spacer group may have a substituent group such as a halogen atom (fluorine, chlorine, bromine), a cyano group, a methyl group or an ethyl group.

The mesogen group represented by M may be selected from any known mesogen groups, and is preferably selected from the group represented by the formula (II).

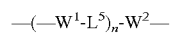  Formula (II)

In formula (II), each of $W^1$ and $W^2$ represent a divalent cyclic alkylene or alkenylene group, a divalent arylene group, or a divalent hetero-cyclic group; and $L^5$ represents a single bond or a linking group. Examples of the linking group represented by $L^5$ include those exemplified as examples of $L^1$ to $L^4$ in the formula (I) and —CH$_2$—O— and —O—CH$_2$—. In formula (II), n is 1, 2 or 3.

Examples of $W^1$ and $W^2$ include 1,4-cyclohexanediyl, 1,4-phenylene, pyrimidine-2,5-diyl, pyridine-2,5-diyl, 1,3,4- thiazole-2,5-diyl, 1,3,4-oxadiazole-2,5-diyl, naphtalene-2,6-diyl, naphtalene-1,5-diyl, thiophen-2,5-diyl, pyridazine-3,6-diyl. As for 1,4-cyclohexane diyl, either structural isomers having trans-form or cis-form, or any mixture based on an arbitrary compositional ratio may be used in the present invention, where the trans-form is preferable. Each of $W^1$ and $W^2$ may have a substituent, where the examples of the substituent include halogen atoms (fluorine, chlorine, bromine, iodine), cyano, alkyl groups having 1 to 10 carbon atoms (methyl, ethyl, propyl, etc.), alkoxy groups having 1 to 10 carbon atoms (methoxy, ethoxy, etc.), acyl group having 1 to 10 carbon atoms (formyl, acetyl, etc.), alkoxycarbonyl group having 1 to 10 carbon atoms (methoxycarbonyl, ethoxycarbonyl, etc.), acyloxy groups having 2 to 10 carbon atoms (acetyloxy, propionyloxy, etc.), nitro group, trifluoromethyl group and difluoromethyl group.

Basic skeleton of the most preferable examples of the mesogen group represented by formula (II) are listed below. These groups may further be substituted by the above-described substituents.

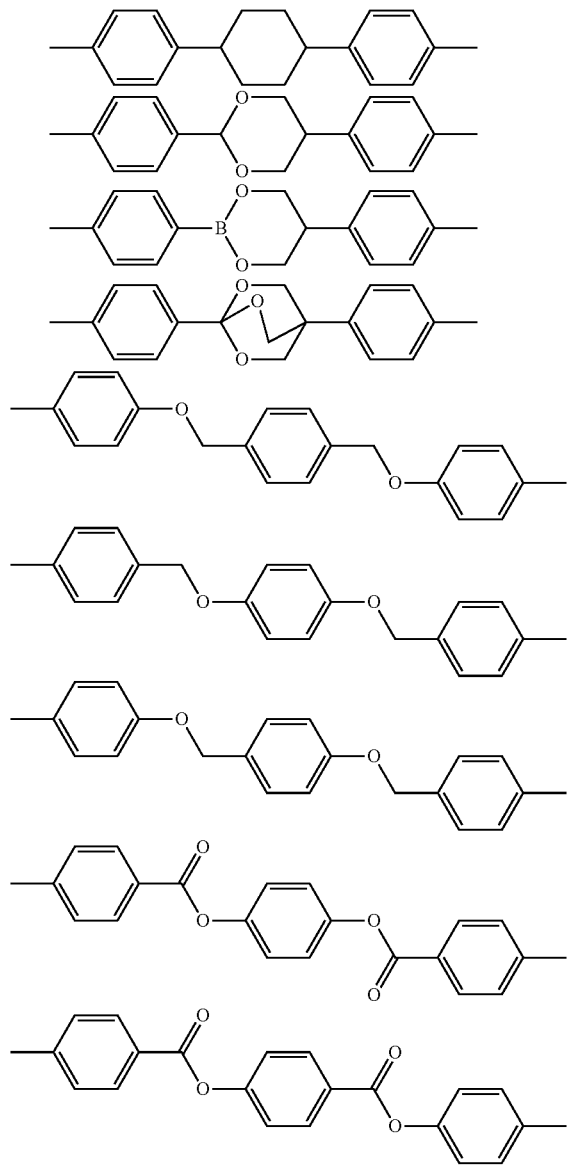

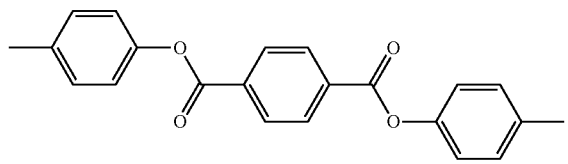

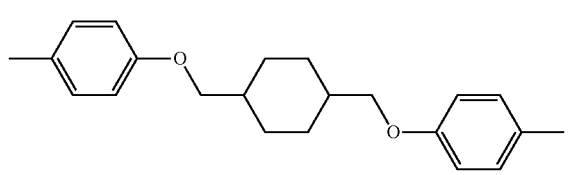

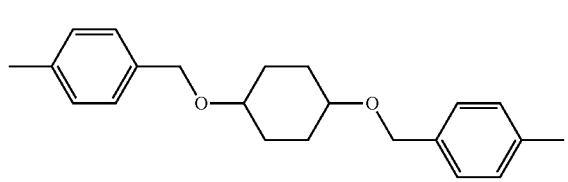

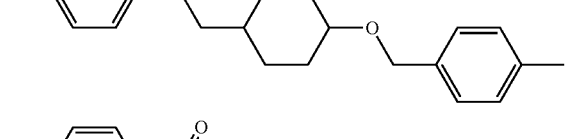

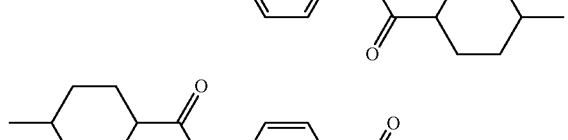

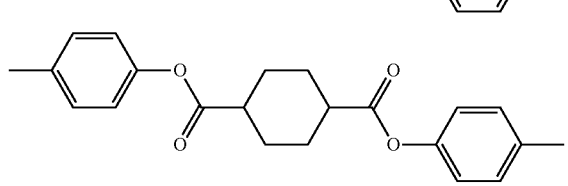

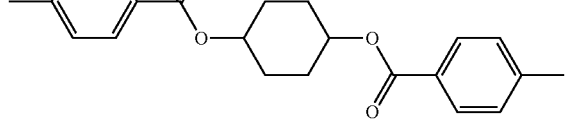

Examples the compound represented by formula (I) include, but not to be limited to, these described below. The compounds represented by formula (I) may be prepared according to a method described in JP-T-11-513019 ("JP-T" means a published Japanese translation of PCT international application) (WO97/00600).

I-1
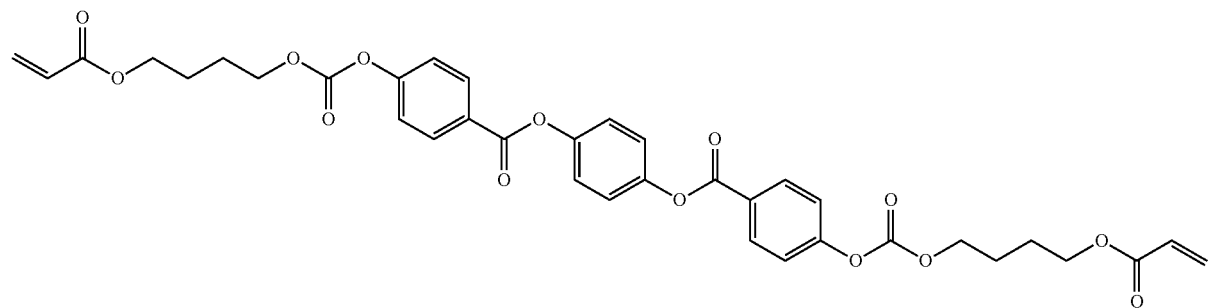
I-2
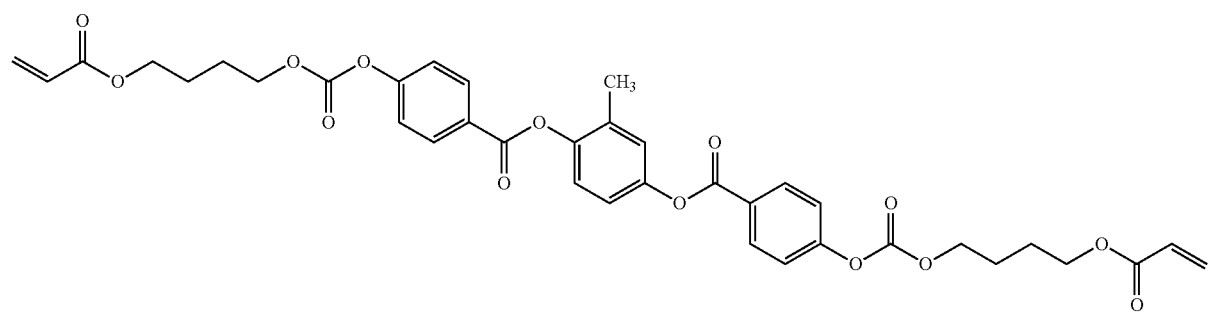
I-3
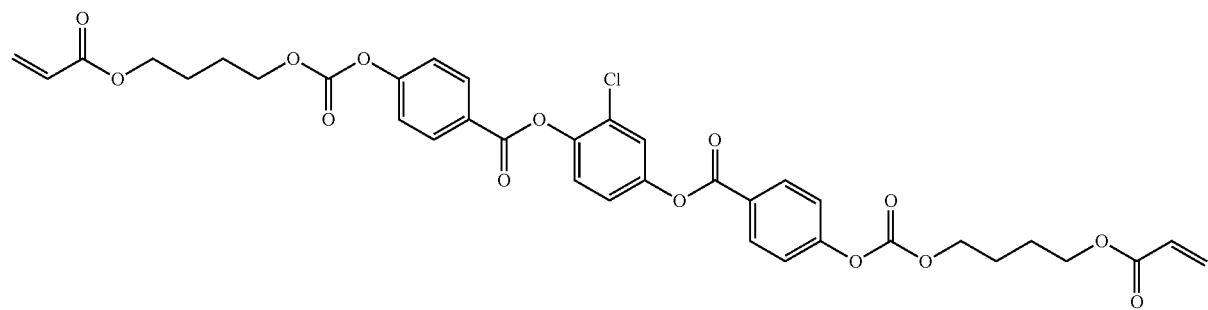
I-4
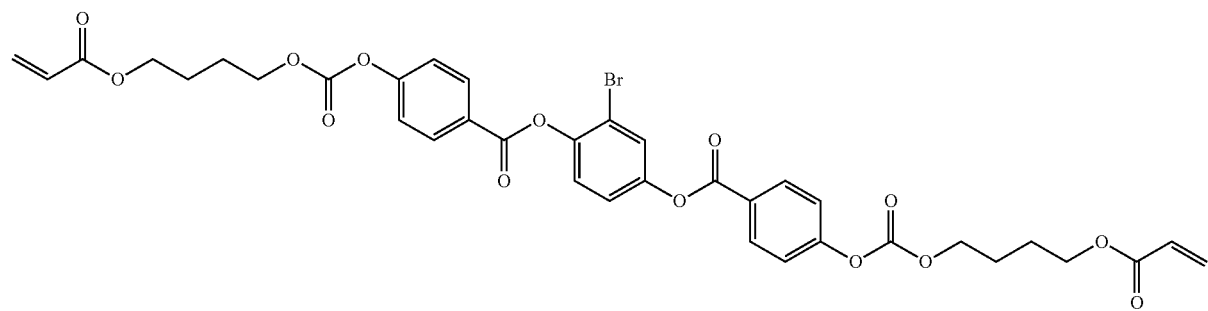

I-5
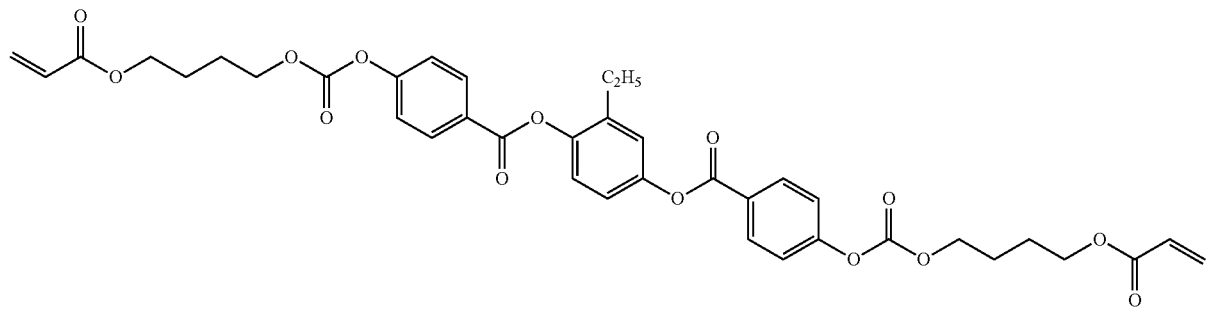
I-6
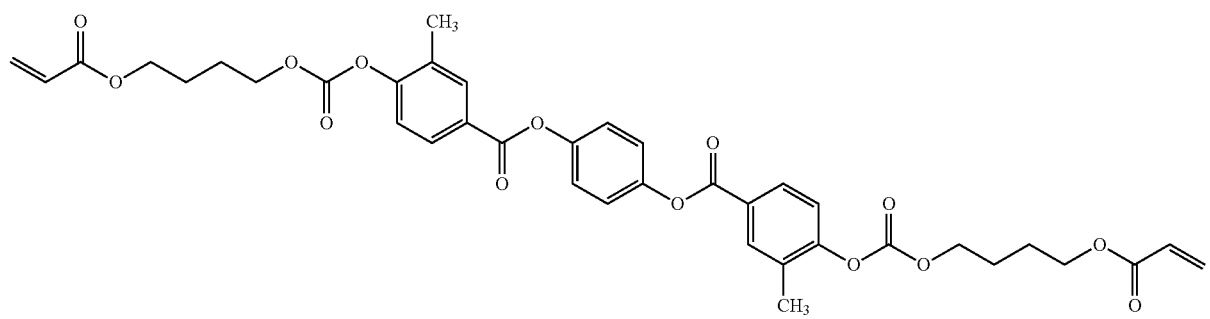
I-7
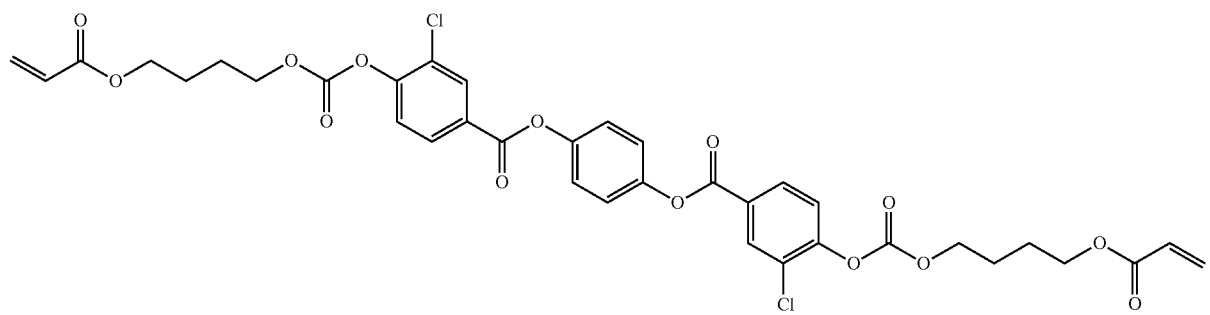
I-8
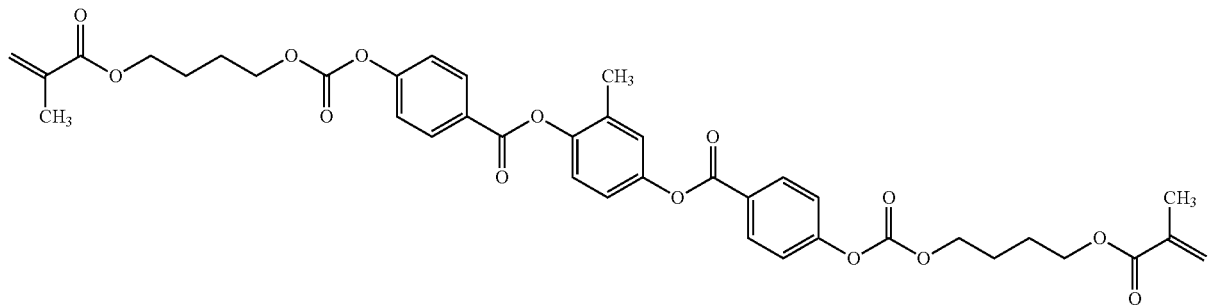

I-9
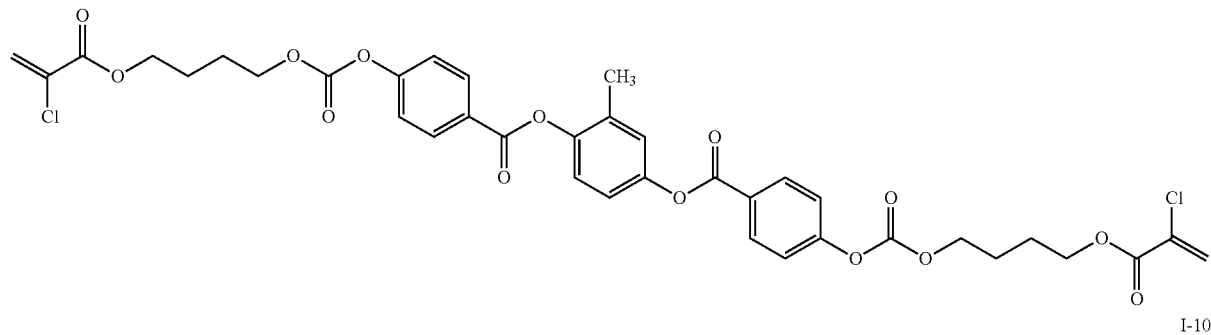
I-10
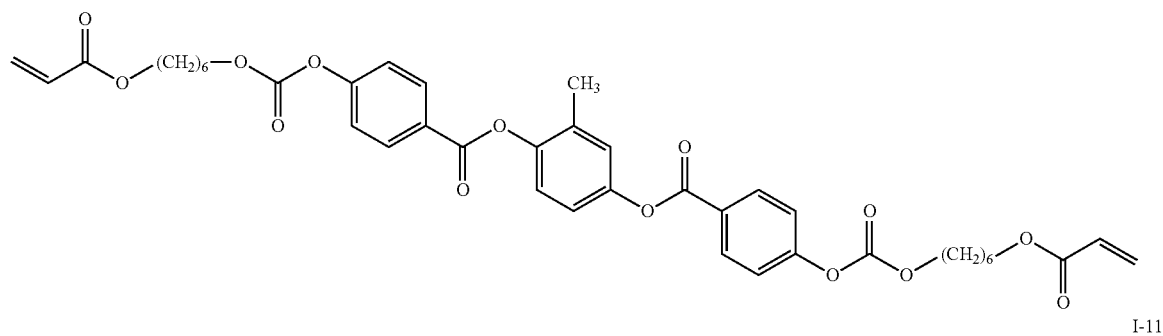
I-11
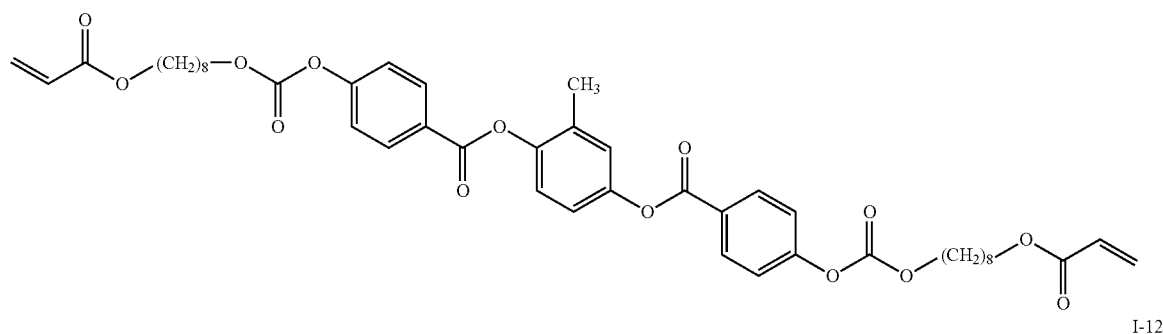
I-12
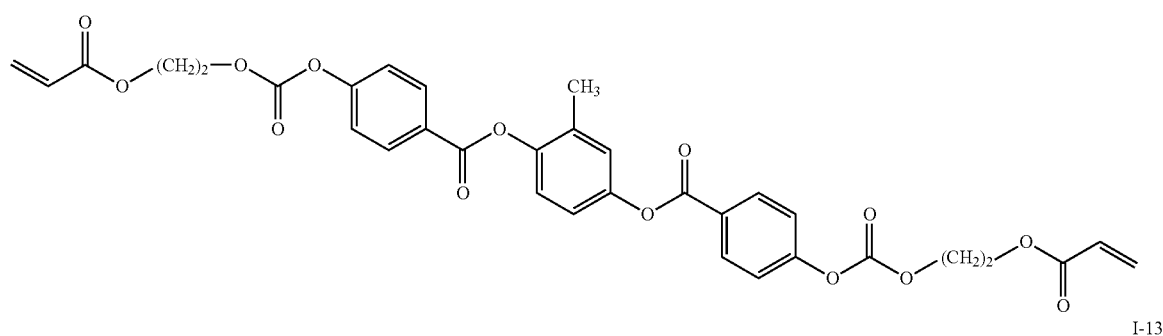
I-13
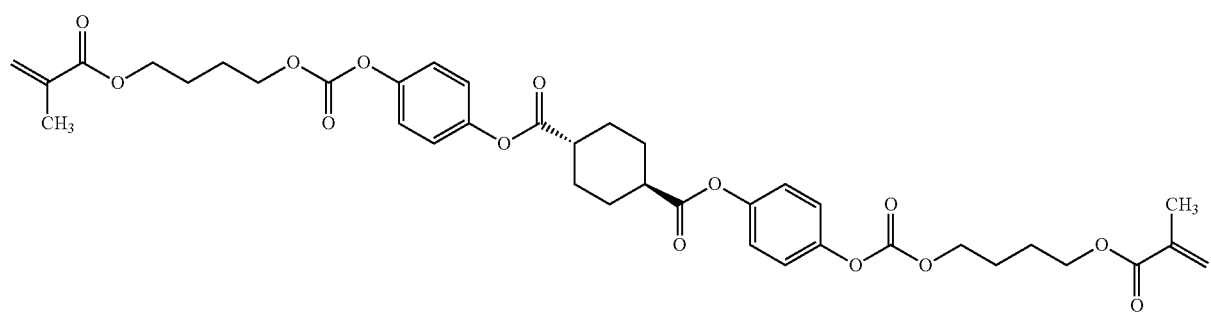

I-14
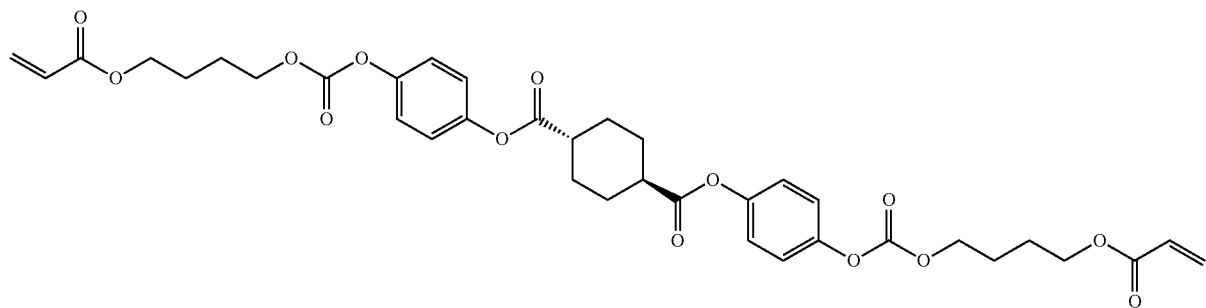
I-15
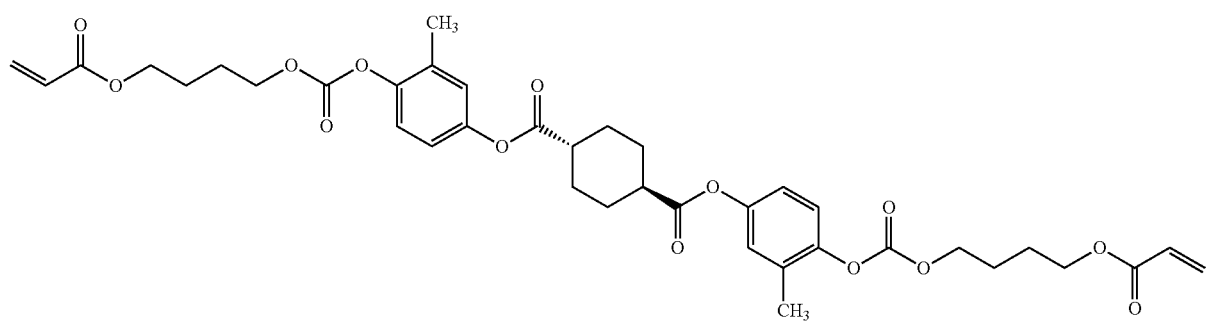
I-16
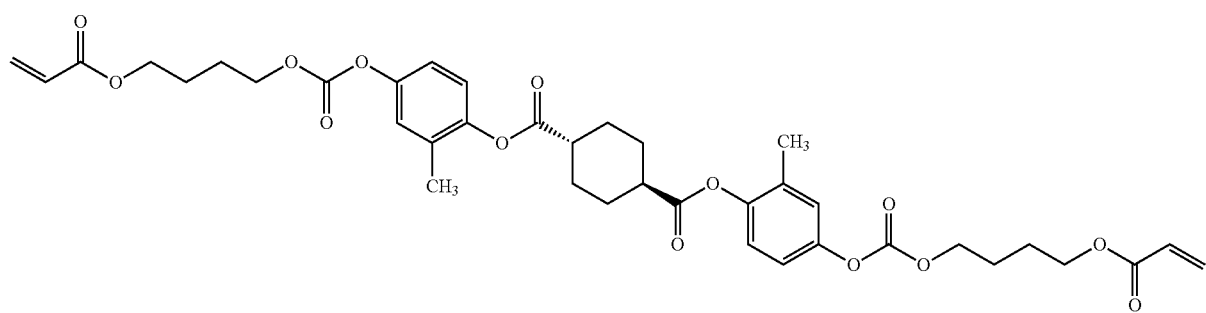
I-17
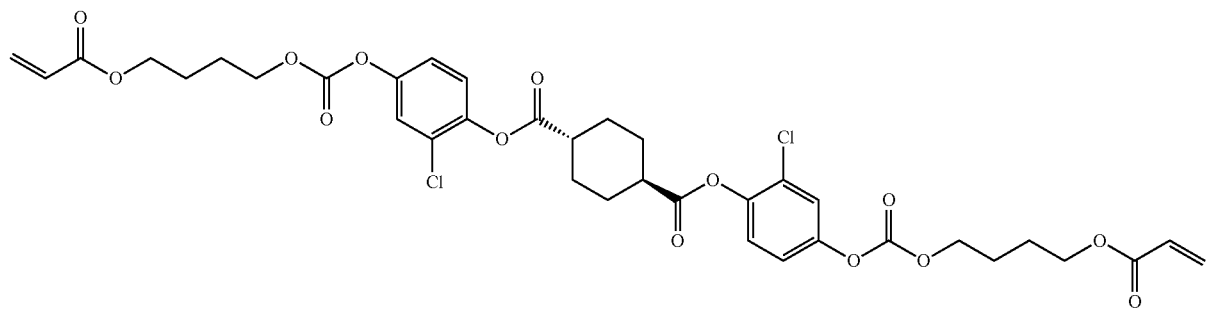

-continued
I-18
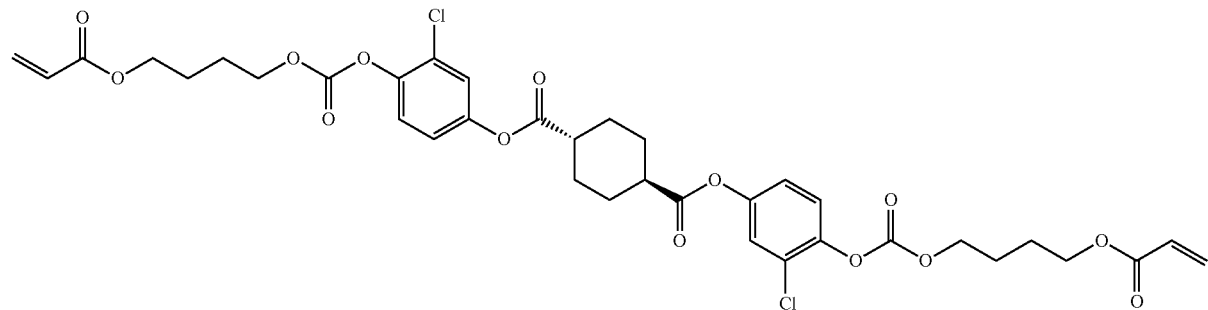
I-19
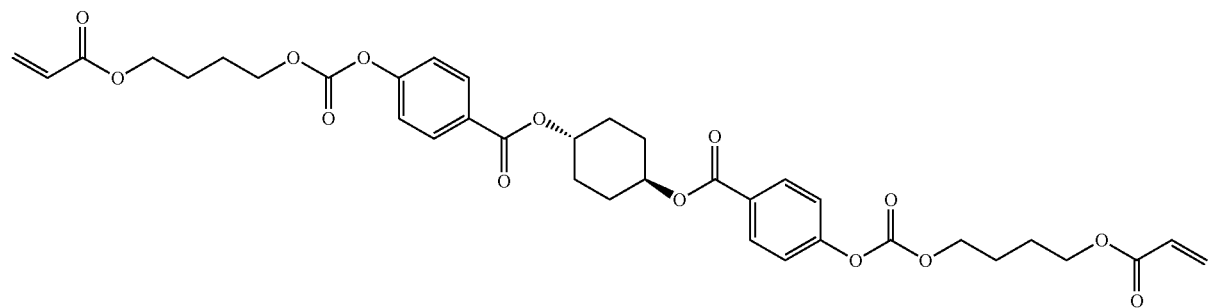
I-20
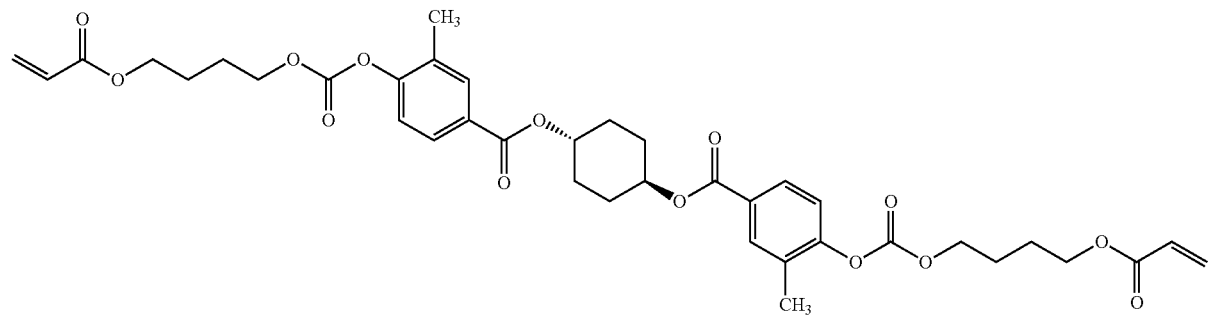
I-21
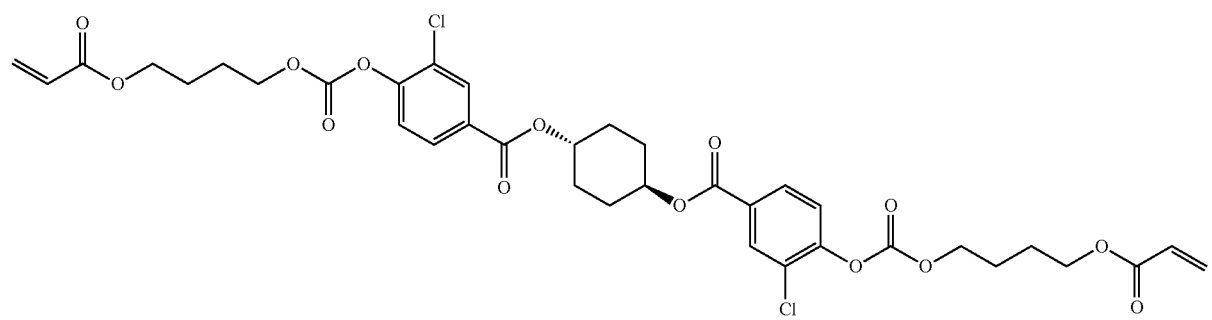
I-22
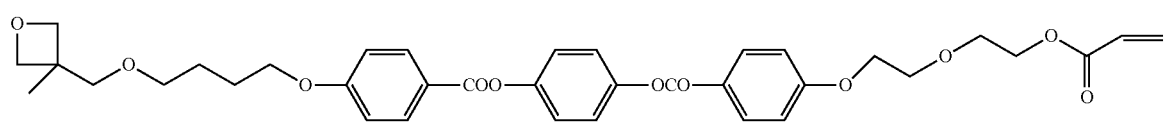

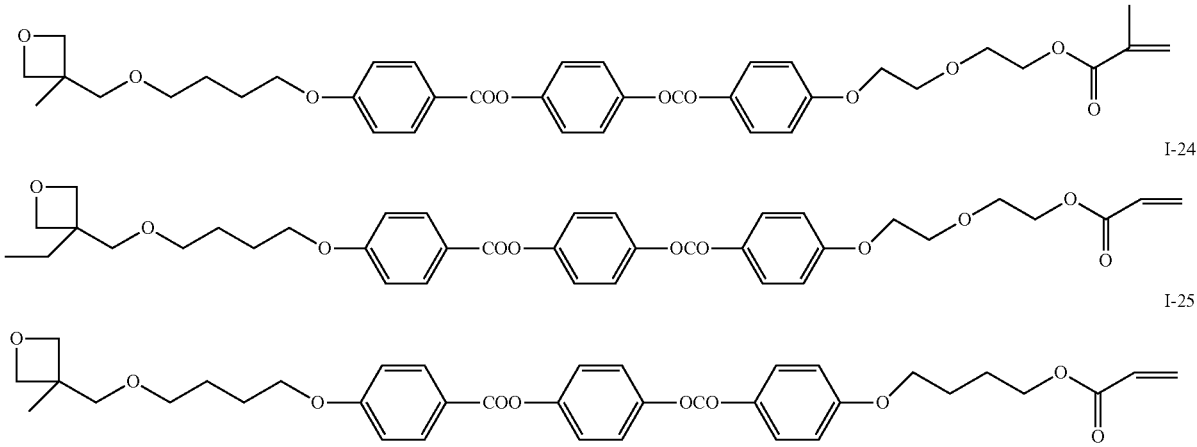

In another aspect of the present invention, a discotic liquid crystal is used in the optically anisotropic layer. The optically anisotropic layer is preferably a layer of a low-molecular-weight liquid-crystalline discotic compound such as monomer or a layer of a polymer obtained by polymerization (curing) of a polymerizable liquid-crystalline discotic compound. Illustrative of the discotic (disk-like) compounds can include benzene derivatives disclosed in a study report of C. Destrade et al., Mol. Cryst., vol. 71, page 111 (1981); truxene derivatives disclosed in a study report of C. Destrade et al., Mol. Cryst., vol. 122, page 141 (1985), and Phyics. Lett., A, vol. 78, page 82 (1990); cyclohexane derivatives disclosed in a study report of B. Kohne et al., Angew. Chem. vol. 96, page 70 (1984); and azacrown series and phenylacetylene series macrocycles disclosed in a study report of J. M. Lehn et al., J. Chem. Commun. page 1794 (1985), and a study report of J. Zhang et al., J. Am. Chem. Soc. vol. 116, page 2655 (1994). The above mentioned discotic (disk-like) compounds generally have a discotic core in the central portion and groups (L), such as linear alkyl or alkoxy groups or substituted benzoyloxy groups, which are substituted radially from the core. Among them, there are compounds exhibiting liquid crystallinity, and such compounds are generally called as discotic liquid crystal. However, such molecular assembly in uniform orientation shows negative uniaxiality, although it is not limited to the description. In the specification, the term of "formed of a discotic compound" is used not only when finally comprising the discotic compound as a low-molecular weight compound, but also when finally comprising a high-molecular weight discotic compound, no longer exhibiting liquid crystallinity, formed by carrying out polymerizing or crosslinking reaction of the low-molecular weight discotic compound having at least one reactive group capable of thermal reaction or photo reaction under heating or under irradiation of light.

In the present invention, it is preferred to use the discotic liquid-crystalline compound represented by formula (III).

$$D(\text{-L-P})_n \qquad \text{Formula (III)}$$

In formula (III), D represents a disc core; L represents a divalent linking group; P is a polymerizable group; and n represents an integer of 4 to 12. The groups (-L-P) may be the same with or different from each other.

Preferable examples of the disc core (D), the divalent linking group (L) and the polymerizable group (P) in formula (III) are (D1) to (D15), (L1) to (L25) and (P1) to (P18), respectively, described in JP-A-2001-4837; and the contents of the patent publication are preferably employed in the present invention.

Preferable examples of the discotic compound are shown below.

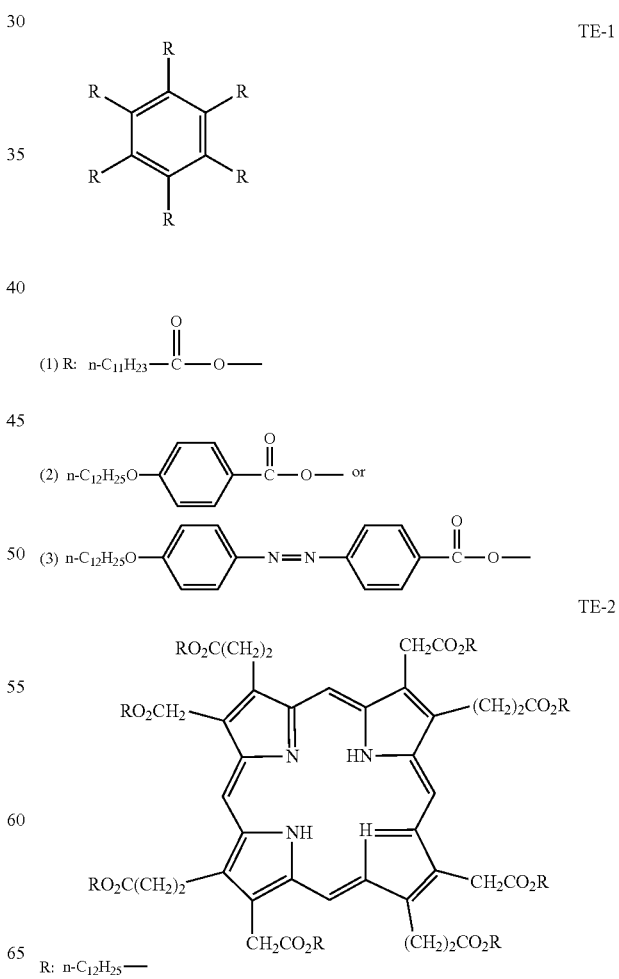

TE-3
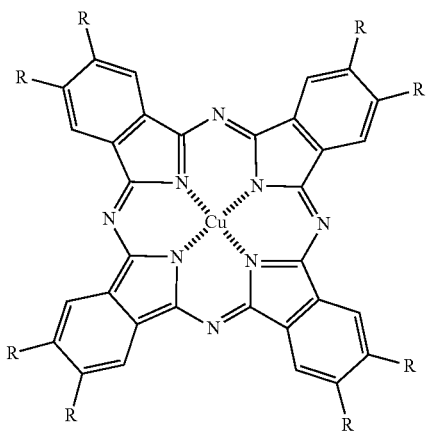
R: n-C$_{12}$H$_{25}$OCH$_2$—
TE-4
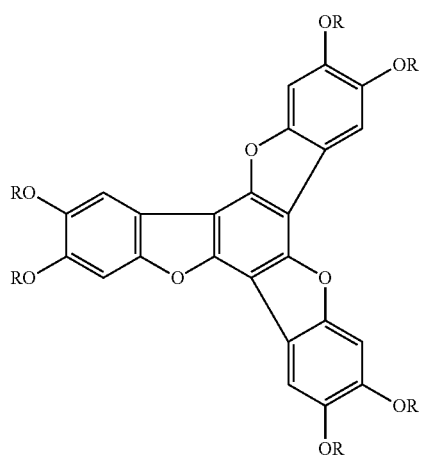
(1) R: n-C$_{12}$H$_{25}$O—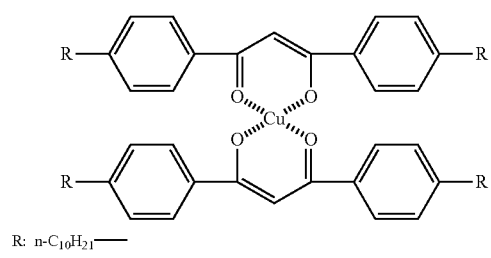— or
(2) n-C$_{13}$H$_{27}$CO—
TE-5
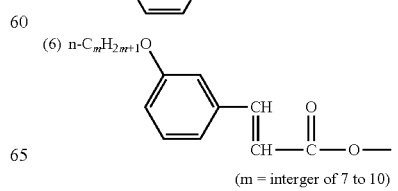
R: n-C$_{10}$H$_{21}$—
TE-6
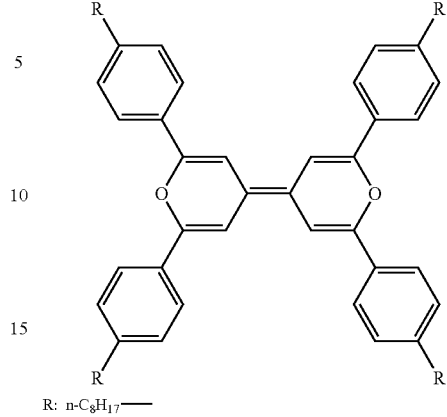
R: n-C$_8$H$_{17}$—
TE-7
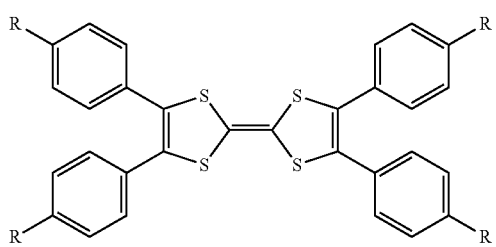
R: n-C$_{16}$H$_{33}$O—
TE-8
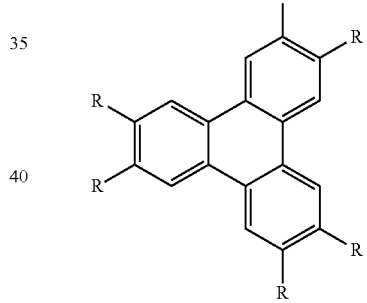
(1) n-C$_m$H$_{2m+1}$O—    (2) n-C$_8$H$_{17}$—C(=O)—O—
(m = integer of 2 to 15)
(3) n-C$_8$H$_{17}$O—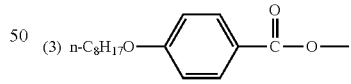—
(4) n-C$_7$H$_{16}$O—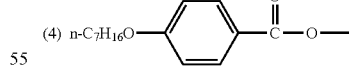—
(5) n-C$_6$H$_{11}$O—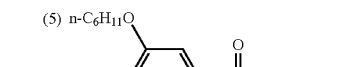—
(6) n-C$_m$H$_{2m+1}$O—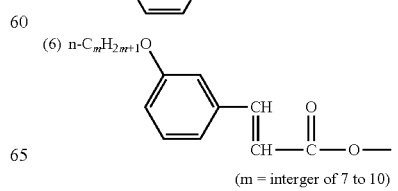—
(m = interger of 7 to 10)

(7) 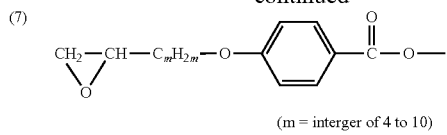
(m = interger of 4 to 10)

(8) 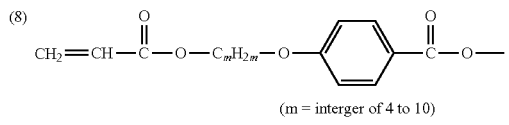
(m = interger of 4 to 10)

TE-9
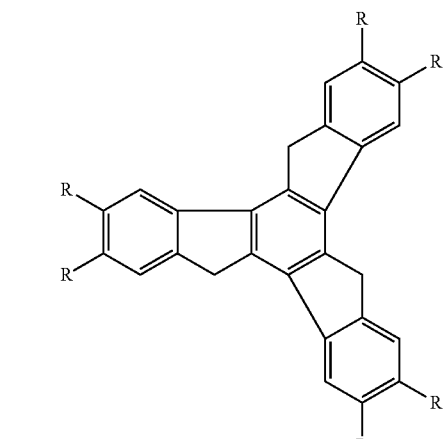

R: (1) 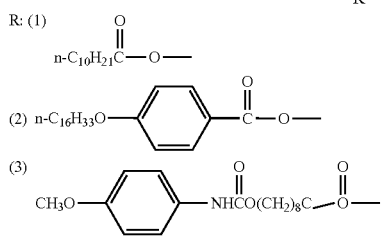

(2) n-C₁₆H₃₃O—⟨benzoate⟩—C(=O)—O—

(3) CH₃O—⟨phenyl⟩—NHCO(CH₂)₈C(=O)—O—

TE-10
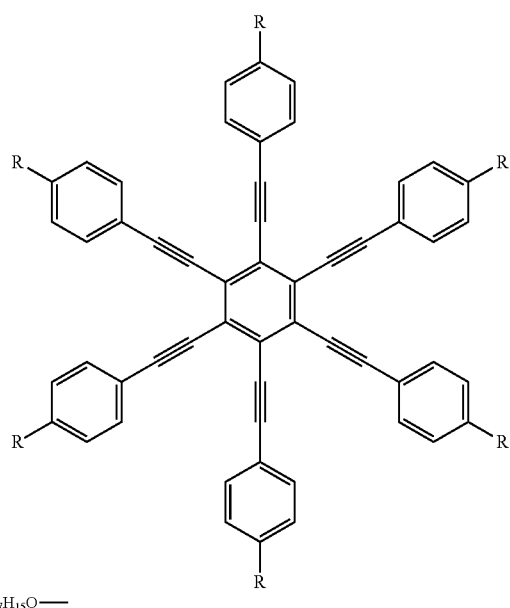

R: C₇H₁₅O—

TE-11
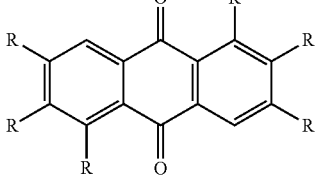

R: (1) 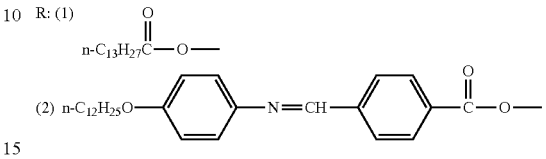 n-C₁₃H₂₇C(=O)—O—

(2) n-C₁₂H₂₅O—⟨phenyl⟩—N=CH—⟨phenyl⟩—C(=O)—O—

The optically anisotropic layer is preferably formed according to a method comprising applying a composition containing liquid crystalline compound (e.g., a coating liquid) to a surface of an alignment layer, described in detail later, aligning liquid crystalline molecules as to make an aligned state exhibiting a desired crystalline phase, and fixing the aligned state under heating or light-irradiating.

When a discotic liquid crystalline compound having reactive groups is used as the liquid crystalline compound, the discotic molecules in the layer may be fixed in any alignment state such as a horizontal alignment state, vertical alignment state, tilted alignment state and twisted alignment state. In the specification, the term "horizontal alignment" means that, regarding rod-like liquid-crystalline molecules, the molecular long axes thereof and the horizontal plane of a support are parallel to each other, and, regarding discotic liquid-crystalline molecules, the disk-planes of the cores thereof and the horizontal plane of a support are parallel to each other. However, they are not required to be exactly parallel to each other, and, in the specification, the term "horizontal alignment" should be understood as an alignment state in which molecules are aligned with a tilt angle against a horizontal plane less than 10°. The tilt angle is preferably from 0° to 5°, more preferably 0° to 3°, much more preferably from 0° to 2°, and most preferably from 0° to 1°.

When two or more optically anisotropic layers formed of the compositions containing liquid-crystalline compounds are stacked, the combination of the liquid-crystalline compounds is not particularly limited, and the combination may be a stack formed of layers all comprising discotic liquid-crystalline compounds, a stack formed of layers all comprising rod-like liquid-crystalline compounds, or a stack formed of a layer comprising discotic liquid-crystalline compounds and a layer comprising rod-like liquid-crystalline compounds. Combination of orientation state of the individual layers also is not particularly limited, allowing stacking of the optically anisotropic layers having the same orientation states, or stacking of the optically anisotropic layer having different orientation states.

The optically-anisotropic layer is preferably formed by applying a coating solution, which contains at least one liquid-crystalline compound, the following polymerization initiator and other additives, on a surface of an alignment layer described below. Organic solvents are preferably used as a solvent for preparing the coating solution, and examples thereof include amides (e.g., N,N-dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane), ester (e.g., methyl acetate, butyl acetate), ketones (e.g., acetone, methylethylketone), and ethers (e.g., tetrahydrofuran, 1,2- dimethoxyethane). In particular, alkyl halides and ketones are preferable. Two or more kinds of the solvents in combination may be used.

(Fixing of Liquid-Crystalline Compounds in an Alignment State)

It is preferred that the liquid-crystalline compounds in an alignment state are fixed without disordering the state. Fixing is preferably carried out by the polymerization reaction of the reactive groups contained in the liquid-crystalline compounds. The polymerization reaction includes thermal polymerization reaction using a thermal polymerization initiator and photo-polymerization reaction using a photo-polymerization initiator. Photo-polymerization reaction is preferred. Photo-polymerization reaction may be radical or cationic polymerization. Examples of the radical photo-polymerization initiators include α-carbonyl compounds (described in U.S. Pat. Nos. 2,367,661 and 2,367,670), acyloin ethers (described in U.S. Pat. No. 2,448,828), α-hydrocarbon-substituted aromatic acyloin compounds (described in U.S. Pat. No. 2,722,512), polynuclear quinone compounds (described in U.S. Pat. Nos. 3,046,127 and 2,951,758), combinations of a triarylimidazole dimer with p-aminophenyl ketone (described in U.S. Pat. No. 3,549,367), acridine and phenazine compounds (described in JP-A-60-105667 and U.S. Pat. No. 4,239,850), and oxadiazol compounds (described in U.S. Pat. No. 4,212,970). As the cationic-polymerization initiator, examples include organic sulfonium salts, iodonium salts, and phosphonium salts. The organic sulfonium salts are preferred, and triphenyl sulfonium salts are particularly preferred. As a counter ion of these compounds, hexafluoroantimonate, hexafluorophosphate, or the like is preferably used.

It is preferable to use the photopolymerization initiator in an amount of 0.01 to 20 mass %, more preferably 0.5 to 5 mass %, based on the solid content in the coating solution. In the photoirradiation for polymerizing the liquid crystalline compounds, it is preferable to use ultraviolet ray. The irradiation energy is preferably from 10 mJ/cm$^2$ to 10 J/cm$^2$, more preferably from 25 to 800 mJ/cm$^2$. Illuminance is preferably 10 to 1,000 mW/cm$^2$, more preferably 20 to 500 mW/cm$^2$, and further preferably 40 to 350 mW/cm$^2$. The irradiation wavelength is preferably 250 to 450 nm, and more preferably 300 to 410 nm at the peak. Irradiation may be carried out in an atmosphere of inert gas such as nitrogen gas and/or under heating to facilitate the photo-polymerization reaction.

{Orientation Induced by Irradiation of Polarized Light (Photoinduced Orientation)}

The optically anisotropic layer may exhibit or enhance in-plane retardation attributed to photoinduced orientation with the aid of polarized light irradiation. The polarized light irradiation may be carried out in photo-polymerization method in the fixation of orientation, or the polarized light irradiation may precede and then may be followed by non-polarized light irradiation for further fixation, or the non-polarized light irradiation for fixation may precede and the polarized light irradiation may succeed for the photoinduced orientation. It is preferred that only the polarized light irradiation is conducted or the polarized light irradiation precedes and is followed by non-polarized light irradiation for further fixation. When the polarized light irradiation is carried out in photo-polymerization method in the fixation of orientation and a radical photo-polymerization initiator is used as the photo-polymerization initiator, the polarized light irradiation is preferably carried out under an inert gas atmosphere having an oxygen concentration is 0.5% or below. The irradiation energy is preferably 20 mJ/cm$^2$ to 10 J/cm$^2$, and more preferably 100 mJ/cm$^2$ to 800 mJ/cm$^2$. The illuminance is preferably 20 to 1000 mW/cm$^2$, more preferably 50 to 500 mW/cm$^2$, and still more preferably 100 to 350 mW/cm$^2$.

Types of the liquid-crystalline compound to be cured by the polarized light irradiation are not particularly limited, wherein the liquid-crystalline compound having an ethylenically unsaturated group as the reactive group is preferable. It is preferred that the irradiation light to be used has a peak falling within the range from 300 to 450 nm, more preferred from 350 to 400 nm.

(Post-Curing with UV-Light Irradiation after Irradiation of Polarized Light)

After the first irradiation of polarized light for photoinduced orientation, the optically anisotropic layer may be irradiated with polarized or non-polarized ultraviolet light so as to improve the reaction rate (post-curing step). As a result, the adhesiveness is improved and, thus, the optically anisotropic layer can be produced with larger feeding speed. The post-curing step may be carried out with polarized or non-polarized light, and preferably with polarized light. Two or more steps of post-curing are preferably carried out with only polarized light, with only non-polarized light or with combination of polarizing and non-polarized light. When polarized and non-polarized light are combined, irradiating with polarized light previous to irradiating with non-polarized light is preferred. The irradiation of UV light may be or may not be carried out under an inert gas atmosphere. However, when a radical photo-polymerization initiator is used as the photo-polymerization initiator, the irradiation may be carried out preferably under an inert gas atmosphere where the oxygen gas concentration is 0.5% or lower. The irradiation energy is preferably 20 mJ/cm$^2$ to 10 J/cm$^2$, and more preferably 100 to 800 mJ/cm$^2$. The illuminance is preferably 20 to 1,000 mW/cm$^2$, more preferably 50 to 500 mW/cm$^2$, and still more preferably 100 to 350 mW/cm$^2$. As the irradiation wavelength, the irradiation of polarized light has a peak falling within the range preferably from 300 to 450 nm, more preferably from 350 to 400 nm. The irradiation of non-polarized light has a peak falling within the range preferably from 200 to 450 nm, more preferably from 250 to 400 nm.

(Fixing the Alignment State of Liquid-Crystalline Compounds Having Radically Reactive Group and Cationically Reactive Group)

As described above, it is also preferred that liquid-crystalline compound has two or more kinds of reactive groups which have different polymerization condition to each other. In such case, an optically anisotropic layer comprising polymer having unreacted reactive group can be produced by polymerizing only one type of reactive groups among plural types of reactive groups by selecting polymerization condition. The conditions which are suitable for the polymerization and fixation of the liquid-crystalline compounds having radically reactive group and cationically reactive group (the aforementioned I-22 to I-25 as specific examples) are explained below.

First, as the polymerization initiator, only a photopolymerization initiator which acts on a reactive group intended to be polymerized is preferred to be used. That is, it is preferred that, only radical photopolymerization initiator is used when radically reactive groups are selectively polymerized, and only cationic photopolymerization initiator is used when cationically reactive groups are selectively polymerized. The content of the photopolymerization initiator falls in the range preferably from 0.01 to 20% by mass, more preferably from 0.1 to 8% by mass, and further preferably from 0.5 to 4% by mass of the total solid content in the coating solution.

Second, light irradiation for the polymerization is preferably conducted by using ultra violet ray. When the irradiation energy and/or illuminance are too high, non-selective reaction of both of the radically reactive group and cationically reactive group is of concern. In view of the above, the irradiation energy is preferably 5 mJ/cm$^2$ to 500 mJ/cm$^2$, more preferably 10 to 400 mJ/cm$^2$, and particularly preferably 20 to 200 mJ/cm$^2$. The illuminance is preferably 5 to 500 mW/cm$^2$, more preferably 10 to 300 mW/cm$^2$, and particularly preferably 20 to 100 mW/cm$^2$. As the irradiation wavelength, the light has a peak falling within the range preferably from 250 to 450 nm, more preferably from 300 to 410 nm.

Among photopolymerization reaction, the reaction by using a radical photopolymerization initiator is inhibited by oxygen, and the reaction by using a cationic photopolymerization initiator is not inhibited by oxygen. Therefore, when one of the reactive groups of the liquid-crystalline compounds having radically reactive group and cationically reactive group is selectively reacted, it is preferred that the light irradiation is carried out in an atmosphere of inert gas such as nitrogen gas when the radically reactive group is selectively reacted, and in an atmosphere containing oxygen (for example, in air atmosphere) when the cationically reactive group is selectively reacted.

(Horizontal Orientation Agent)

At least one compound selected from the group consisting of the compounds represented by formula (1), (2) or (3), and fluorine-containing homopolymer or copolymer using the monomer represented by formula (4), which are shown below, may be added to the composition used for forming the optically anisotropic layer, in order to align the molecules of the liquid-crystalline compounds substantially horizontally.

The formulae (1) to (4) will be described in detail below.

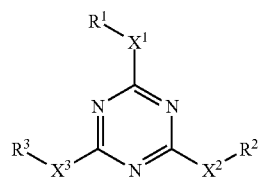

Formula (1)

In formula (1), $R^1$, $R^2$ and $R^3$ each independently represent a hydrogen atom or a substituent; and $X^1$, $X^2$ and $X^3$ each independently represent a single bond or a divalent linking group. As the substituent represented by $R^1$, $R^2$ and $R^3$, preferred is a substituted or unsubstituted alkyl group (preferably an unsubstituted alkyl group or a fluorine-substituted alkyl group), a substituted or unsubstituted aryl group (preferably an aryl group having a fluorine-substituted alkyl group), a substituted or unsubstituted amino group, a substituted or unsubstituted alkoxy group, a substituted or unsubstituted alkylthio group or a halogen atom. In formula (1), the divalent linking group represented by $X^1$, $X^2$ and $X^3$ is preferably selected from the group consisting of an alkylene group, an alkenylene group, a divalent aromatic group, a divalent heterocyclic group, —CO—, —NR$^a$— (in which R$^a$ represents an alkyl group having 1 to 5 carbon atoms, or a hydrogen atom), —O—, —S—, —SO—, —SO$_2$—, and a group made by any combination of two or more kinds thereof; and more preferably a divalent linking group selected from the group consisting of an alkylene group, a phenylene group, —CO—, —NR$^a$—, —O—, —S—, and —SO$_2$—, and a group made by any combination of at least two kinds thereof. The alkylene group preferably has 1 to 12 carbon atoms. The alkenylene group preferably has 2 to 12 carbon atoms. The divalent aromatic group preferably has 6 to 10 carbon atoms.

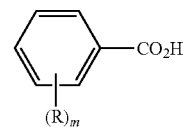

Formula (2)

In formula (2), R represents a substituent, and m represents an integer of 0 to 5. When m is 2 or more, plural R's may be the same or different to each other. Preferable examples of the substituent represented by R are the same as the examples listed above for each of $R^1$, $R^2$ and $R^3$. m is preferably an integer of 1 to 3, more preferably 2 or 3.

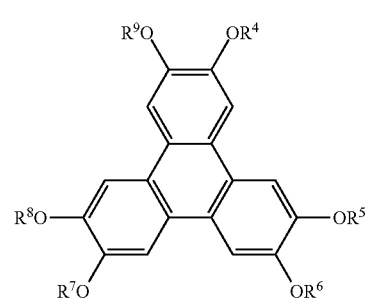

Formula (3)

In formula (3), $R^4$, $R^5$, $R^6$, $R^7$, $R^8$ and $R^9$ each independently represent a hydrogen atom or a substituent. Preferable examples of the substituent represented by each of $R^4$, $R^5$, $R^6$, $R^7$, $R^8$ and $R^9$ are the same as the examples listed above for each of $R^1$, $R^2$ and $R^3$ in formula (1). Examples of the horizontal orientation agent, which can be used in the present invention, include those described in paragraphs (0092) to (0096) in JP-A-2005-099248 and the methods for preparing such compounds are described in the document.

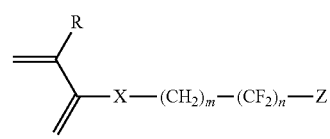

Formula (4)

In formula (4), R represents a hydrogen atom or a methyl group, X represents an oxygen atom or sulfur atom, Z represents a hydrogen atom or a fluorine atom; m represents an integer of 1 to 6, n represents an integer of 1 to 12.

In addition to the fluorine-containing polymer prepared by using the monomer represented by formula (4), the polymer compounds described in JP-A-2005-206638 and JP-A-2006-91205 can be used as horizontal orientation agents for reducing unevenness in coating. The methods of preparation of the compounds are also described in the publications.

The amount of the horizontal orientation agents added is preferably 0.01 to 20% by mass, more preferably 0.01 to 10% by mass, and most preferably 0.02 to 1% by mass with respect to the mass of the liquid crystalline compound. The compounds represented by any of the aforementioned formulae (1) to (4) may be used singly, or two or more types of them may be used in combination.

(Optically Anisotropic Layer Produced by Stretching)

The optically anisotropic layer may be produced by stretching polymer. When a polymer in the optically anisotropic layer, which is preferred to have at least one unreacted reactive group as described above, is produced, a polymer having a reactive group may be stretched or a reactive group may be introduced by using a coupling agent or the like to an optically anisotropic layer prepared by stretching. The characteristics of the optically anisotropic layer include low cost, self-supporting property (a support is not needed when the layer is formed or maintained), and the like.

(Post-Treatment of Optically Anisotropic Layer)

Various post-treatments may be conducted to modify the optically anisotropic layer produced. Examples of the post treatments include corona treatment for improving adhesiveness, addition of a plasticizer for improving plasticity, addition of a heat polymerization inhibitor for improving storage stability, and coupling treatment for improving reactivity. When the polymer in the optically anisotropic layer have an unreacted reactive group, addition of a polymerization initiator suited to the reactive group may also be a useful modification method. For example, by addition of a radical photopolymerization initiator to an optically anisotropic layer fixed by polymerization of a liquid crystalline compound having a cationically reactive group and a radically reactive group by using a cationic photopolymerization initiator, the reaction of the unreacted radically reactive group in the patterned light-exposure afterward can be promoted. As the method of addition of the plasticizer or the photopolymerization initiator, examples include immersing an optically anisotropic layer in the solution of the desired additive, and applying the solution of the desired additive to the optically anisotropic layer for the permeance of the solution. Further, when another layer is applied to the optically anisotropic layer, an additive may be added to the coating solution of the layer for permeance to the optically anisotropic layer. For example, in forming another layer on the optically anisotropic layer, an additive may be added to the layer-coating solution, for penetration thereof into the optically anisotropic layer. In the present invention, it is possible, by properly selecting the kind and the amount of the additive used for penetration, in particular of the photopolymerization initiator, to adjust the relationship between the exposure quantity to respective regions during pattern exposure of the patterned birefringent material and the retardation of the regions finally obtained and thus make the final product have material properties closer to desirable values.

(Birefringence Pattern Builder)

The birefringence pattern builder is a material for producing a birefringence pattern, and a material from which birefringence pattern can be obtained by proceeding predetermined steps. The birefringence pattern builder may generally be in a shape of film or sheet. The birefringence pattern builder may include a functional layer which can be applied with various accessory function, other than the optically anisotropic layer. Examples of the functional layer include a support, an alignment layer, a reflective layer, and a post-adhesive layer. Further, the birefringence pattern builder used as a transferring material or the birefringence pattern builder produced by using a transferring material may include a temporary support, an adhesive layer for transfer, or a dynamic property control layer.

(Support)

The birefringence pattern builder may include a support for the purpose of maintaining the dynamic stability. The support used for the birefringence pattern builder is not particularly limited, and it may be rigid or flexible, and it may be transparent. As a rigid support, examples include, although not particularly limited to, known glasses such as soda glass sheet having a silicon oxide film formed on the surface thereof, low-expansion glass, non-alkali glass, and silica glass sheet, metal plates such as aluminum plate, iron plate, and SUS plate, resin plate, ceramic plate, and stone plate. As a flexible support, examples include, although not particularly limited to, plastic films such as cellulose ester (for example, cellulose acetate, cellulose propionate, and cellulose butyrate), polyolefin (for example, norbornene based polymer), poly(meth) acrylate (for example, polymethylmethacrylate), polycarbonate, polyester, and polysulfone, paper, aluminium foil, and fabric. In view of the convenience of handling, the thickness of the rigid support is preferably 100 to 3,000 $\mu$m, and more preferably 300 to 1,500 $\mu$m. The thickness of the flexible support is preferably 3 to 500 $\mu$m, and more preferably 10 to 200 $\mu$m. The support is preferred to have heat-resistance sufficient for preventing coloring or deformation in the after-mentioned baking step. The support is also preferred to have reflective function itself instead of provided with the after-mentioned reflective layer separately.

(Alignment Layer)

As described above, an alignment layer may be used for forming the optically anisotropic layer. The alignment layer may be generally formed on the surface of a support or a temporary support, or on the surface of an undercoating layer formed on the support. The alignment layer has function of controlling the alignment of liquid crystalline compounds thereon, and, as far as having such function, may be selected from various known alignment layers. The alignment layer that can be employed in the present invention may be provided by rubbing a layer formed of an organic compound (preferably a polymer), oblique vapor deposition, the formation of a layer with microgrooves, or the deposition of organic compounds (for example, omega-tricosanoic acid, dioctadecylmethylammonium chloride, and methyl stearate) by the Langmuir-Blodgett (LB) film method. Further, alignment layers imparted with orientation functions by exposure to an electric or magnetic field or irradiation with light are also exemplified.

Examples of the organic compound, which can be used for forming the alignment layer, include polymers such as polymethyl methacrylate, acrylic acid/methacrylic acid copolymer, styrene/maleimide copolymer, polyvinyl alcohol, poly (N-methyrol acrylamide), polyvinylpyrrolidone, styrene/vinyl toluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, carboxymethyl cellulose, polyethylene, polypropylene and polycarbonates; and silane coupling agents. Preferred examples of the polymer include polyimide, polystyrene, styrene based polymers, gelatin, polyvinyl alcohol and alkyl-modified polyvinyl alcohol having at least one alkyl group (preferably an alkyl group having carbon atoms of 6 or more).

For production of an alignment layer, a polymer may preferably used. The types of the polymer, which is used for forming the alignment layer, may be decided depending on what types of alignment of liquid crystalline compound (in particular, the average tilt angle) is preferred. For forming an alignment layer capable of aligning liquid crystalline compounds horizontally, a polymer which does not lower the surface energy of the alignment layer is used. Specifically, kinds of such a polymer are described in various documents concerning liquid crystal cells or optical compensation sheets. Polyvinyl alcohols, modified polyvinyl alcohols, poly acrylic acid, acrylic acid/acrylate copolymers, polyvinyl pyrrolidone, cellulose and modified cellulose are preferably used. Materials used for producing the alignment layer may have a functional group capable of reacting with the reactive group of the liquid crystalline compound in the optically anisotropic layer. Examples of the polymer having such a functional group include polymers having side chains comprising a repeating unit having such a functional group, and polymers having a cyclic moiety substituted with such a functional group. It is more preferable to use an alignment layer capable of forming a chemical bond with the liquid-crystalline compound at the interface, and a particularly preferable example of such alignment layer is a modified polyvinyl alcohol, described in JP-A-9-152509, which has an acrylic group introduced in the side chain thereof using acid chloride or Karenz MOI (trade name, manufactured by Showa Denko K. K.). The thickness of the alignment layer is preferably 0.01 to 5 μm, and more preferably 0.05 to 2 μm. The alignment layer may functions as an oxygen insulation layer.

Polyimide film which has been used as an alignment layer for LCD (preferably a layer composed of a fluorine-atom containing polyimide) is also preferable. The film may be formed by applying poly(amic acid), provided, for example, as LQ/LX series products by Hitachi Chemical Co., Ltd or as SE series products by NISSAN CHEMICAL INDUSTRIES, LTD, to a surface of the support, heating at 100 to 300° C. for 0.5 to one hour to form a polymer layer, and rubbing a surface of the polymer layer.

The rubbing treatment may be carried out with known techniques which have been employed in the usual step for aligning of LCD. In particular, the rubbing treatment may be carried out by rubbing a surface of a polymer layer in a direction with paper, gauze, felt, rubber, nylon or polyester fiber or the like. The rubbing treatment may be carried out, for example, by rubbing a surface of a polymer layer in a direction several times with a cloth having the same length and the same diameter fibers grafted uniformly.

Examples of a deposition material used in inorganic oblique vapor deposition film include metal oxides such as $SiO_2$, which is a typical material, $TiO_2$ and ZnO; fluorides such as $MgF_2$, metals such as Au and Al. Any high dielectric constant metal oxides can be used in oblique vapor deposition, and, thus, the examples thereof are not limited to the above mentioned materials. The inorganic oblique deposition film may be produced with a deposition apparatus. The deposition film may be formed on an immobile polymer film (a support) or on a long film fed continuously.

(Reflective Layer)

The birefringence pattern builder may include a reflective layer for the purpose of producing more readily identifiable birefringence pattern. As the reflective layer, examples include, but not to be limited to, metal layer such as aluminum or silver.

(Post-Adhesive Layer)

The birefringence pattern builder may include a post-adhesive layer in order that the patterned birefringent product produced after, the after-mentioned patterned light exposure and baking can be attached to another product. The material of the post-adhesive layer is not particularly limited, but preferred to be a material which has adhesiveness even after the baking step for production of the birefringence pattern.

(Two or More Optically Anisotropic Layer)

The birefringence pattern builder may include two or more optically anisotropic layers. The two or more optically anisotropic layers may be adjacent to each other in direction of the normal line, or may sandwich another functional layer. The two or more optically anisotropic layers may have almost the same retardation to each other, or different retardation to each other. The slow axes of them may be in the same direction to each other, or different direction to each other.

As an example wherein a birefringence pattern builder having two or more optically anisotropic layers laminated so as that the slow axis of each is in the same direction is used, a pattern having large retardation can be produced. Even when the optically anisotropic layer at hand singly has insufficient retardation, a patterned optically anisotropic layer including a region having large retardation can be readily obtained by laminating two or three layers and then conducting a patterned light-exposure.

(Method of Producing Birefringence Pattern Builder)

The method of producing the birefringence pattern builder is not particularly limited. For example, the birefringence pattern builder may be produced by: directly forming an optically anisotropic layer on a support; transferring an optically anisotropic layer on a support by using another birefringence pattern builder used as a transferring material; forming a self-supporting optically anisotropic layer; forming another functional layer on a self-supporting optically anisotropic layer; or attaching a support to a self-supporting optically anisotropic layer; or the like. Among these, in view of avoiding limitation to the property of the optically anisotropic layer, direct formation of an optically anisotropic layer on a support and transfer of an optically anisotropic layer on a support by using transferring material are preferred. Further, in view of avoiding limitation to the support, transfer of an optically anisotropic layer on a support by using transferring material is more preferred.

As the method for producing the birefringence pattern builder having two or more optically anisotropic layers, the birefringence pattern builder may be produced by, for example, directly forming an optically anisotropic layer on a different birefringence pattern builder; transferring an optically anisotropic layer on a birefringence pattern builder by using a different birefringence pattern builder used as a transferring material. Among these, transfer of an optically anisotropic layer on a birefringence pattern builder by using another birefringence pattern builder used as a transferring material is more preferable.

A birefringence pattern builder used as a transferring material will be explained in the followings. A birefringence pattern builder used as a transferring material may be referred to as "transferring material for producing birefringence pattern" in the specification especially in the after-mentioned Examples.

(Temporary Support)

The birefringence pattern builder used as a transferring material is preferred to include a temporary support. The temporary support is not particularly limited and may be transparent or opaque. Examples of the polymer, which can constitute a temporary support, include cellulose ester (for example, cellulose acetate, cellulose propionate, and cellulose butyrate), polyolefin (for example, norbornene based polymer), poly(meth)acrylate (for example, polymethylmethacrylate), polycarbonate, polyester, and polysulfone. For the purpose of optical property examination in a manufacturing method, the support is preferably selected from transparent and low-birefringence polymer films. Examples of the low-birefringence polymer films include cellulose ester films and norbornene based polymer films. Commercially available polymers such as a norbornene based polymer, "ARTON" provided by JSR and "ZEONEX" and "ZEONOR" provided by ZEON CORPORATION may be used. Polycarbonate, poly(ethylene terephthalate), or the like which is inexpensive, may also be preferably used.

(Adhesive Layer for Transfer)

The transferring material is preferred to have an adhesive layer for transfer. The adhesive layer for transfer is not particularly limited as far as the layer is transparent and non-colored, and has sufficient property for transfer. Examples include adhesive layer using an adhesive agent, a pressure-sensitive resin layer, a heat-sensitive resin layer, and the above-mentioned photo-sensitive resin layer. Among these, the heat-sensitive resin layer and the photo-sensitive resin layer are preferred in view of heat-resistance required in the application to a substrate for liquid crystal display device.

The adhesive agent is preferred to exhibit, for example, good optical transparency, suitable wettability, and adhesive characteristics such as cohesiveness and adhesiveness. Specific examples are adhesive agents prepared using a suitable base polymer such as an acrylic polymer, silicone polymer, polyester, polyurethane, polyether, or synthetic rubber. The adhesive characteristics of the adhesive layer can be suitably controlled by conventionally known methods. These include adjusting the composition and/or molecular weight of the base polymer forming the adhesive layer, and adjusting the degree of crosslinking and/or the molecular weight thereof by means of the crosslinking method, the ratio of incorporation of crosslinking functional groups, and the crosslinking agent blending ratio.

The pressure-sensitive resin layer is not specifically limited as far as it exhibits adhesiveness when pressure is applied. Various adhesives, such as rubbers, acrylics, vinyl ethers, and silicones, can be employed in the pressure-sensitive adhesive. The adhesives may be employed in the manufacturing and coating stages in the form of solvent adhesives, non-water-based emulsion adhesives, water-based emulsion adhesives, water-soluble adhesives, hot melt adhesives, liquid hardening adhesives, delayed tack adhesives, and the like. Rubber adhesives are described in the New Polymer Library 13, "Adhesion Techniques," Kobunshi Kankokai (K. K.), p. 41 (1987). Examples of the vinyl ether adhesives include vinyl ether comprised mainly of alkyl vinyl ether compounds having 2 to 4 carbon atoms, and vinyl chloride/vinyl acetate copolymers, vinyl acetate polymers, polyvinyl butyrals, and the like, to which a plasticizer is admixed. With respect to the silicone adhesives, rubber siloxane is used to impart film formation and condensation strength of the film, and resinous siloxane is used to impart adhesiveness or tackiness.

The heat-sensitive resin layer is not specifically limited as far as it exhibits adhesiveness when heat is applied. Examples of the heat-sensitive adhesives include hot-melt compounds and thermoplastic resins. Examples of the hot-melt compounds include low molecular weight compounds in the form of thermoplastic resins such as polystyrene resin, acrylic resin, styrene-acrylic resin, polyester resin, and polyurethane resin; and various waxes in the form of vegetable waxes such as carnauba wax, Japan wax, candelilla wax, rice wax, and auricury wax; animal waxes such as beeswax, insect waxes, shellac, and whale wax; petroleum waxes such as paraffin wax, microcrystalline wax, polyethylene wax, Fischer-Tropshe wax, ester wax, and oxidized waxes; and mineral waxes such as montan wax, ozokerite, and ceresin wax. Further examples include rosin, hydrogenated rosin, polymerized rosin, rosin-modified glycerin, rosin-modified maleic acid resin, rosin-modified polyester resin, rosin-modified phenol resin, ester rubber, and other rosin derivatives; as well as phenol resin, terpene resin, ketone resin, cyclopentadiene resin, aromatic hydrocarbon resin, aliphatic hydrocarbon resin, and alicyclic hydrocarbon resin.

These hot-melt compounds preferably have a molecular weight of, usually 10,000 or less, particularly 5,000 or less, and a melting or softening point desirably falling within a range of 50° C. to 150° C. These hot-melt compounds may be used singly or in combinations of two or more. Examples of the above-mentioned thermoplastic resin include ethylene series copolymers, polyamide resins, polyester resins, polyurethane resins, polyolefin series resins, acrylic resins, and cellulose series resins. Among these, the ethylene series copolymers are preferably used.

The photosensitive resin layer may be formed of a photosensitive polymer composition, for which either of positive type and negative type is acceptable, and commercial resist material may also be used. When used as an adhesive layer for transfer, adhesiveness is preferably exhibited by light irradiation. For improvement of environmental safety and prevention of explosion in the production method, for example, for substrates for liquid crystal display devices, the photosensitive resin layer is preferably developed with an aqueous developing solution containing organic solvents in an amount of 5% or less, particularly preferably with an alkali developing solution. The photosensitive resin layer is preferably formed of a resin composition comprising at least (1) a polymer, (2) a monomer or oligomer, and (3) a photopolymerization initiator or photopolymerization initiator systems.

These components (1) to (3) will be explained below.

(1) Polymer

The polymer (hereinafter also simply referred to as "binder") is preferably an alkali-soluble binder comprising a polymer having a polar group such as a carboxylic acid group or a carboxylate group at its side chain. Examples of the resin include a methacrylic acid copolymer, an acrylic acid copolymer, an itaconic acid copolymer, a crotonic acid copolymer, a maleic acid copolymer, and a partially esterified maleic acid copolymer described in, for example, JP-A-59-44615, JP-B-54-34327 ("JP-B" means examined Japanese patent publication), JP-B-58-12577, JP-B-54-25957, JP-A-59-53836, and JP-A-59-71048. The examples further include a cellulose derivative having a carboxylic acid group at its side chain. In addition to the foregoing, a product obtained by adding a cyclic acid anhydride to a polymer having a hydroxyl group can also be preferably used. In addition, particularly preferable examples of the binder include a copolymer of benzyl (meth)acrylate and (meth)acrylic acid and a multicomponent copolymer of benzyl (meth)acrylate, (meth)acrylic acid; and any other monomer described in U.S. Pat. No. 4,139,391. Each of these binder polymers each having a polar group may be used alone, or may be used in combination with an ordinary film formable polymer so that they are used in a state of a composition. The binder polymer is added in an amount of generally 20 to 70 parts by mass, preferably 25 to 65 parts by mass, and more preferably 25 to 45 parts by mass with respect to the total solid content.

(2) Monomer or Oligomer

The polymerizable monomer or polymerizable oligomer contained in the photosensitive resin layer is preferably a monomer or oligomer which has two or more ethylenically unsaturated double bonds and which undergoes addition-polymerization by irradiation with light. Examples of such monomer or oligomer include a compound having at least one addition-polymerizable ethylenically unsaturated group in the molecule and having a boiling point of 100° C. or higher at normal pressure. Examples thereof include: a monofunctional acrylate and a monofunctional methacrylate such as polyethylene glycol mono(meth)acrylate, polypropylene glycol mono(meth)acrylate, and phenoxyethyl(meth)acrylate; polyethylene glycol di(meth)acrylate, polypropylene glycol di(meth)acrylate, trimethylolethane triacrylate, trimethylolpropane tri(meth)acrylate, trimethylolpropane diacrylate, neopentyl glycol di(meth)acrylate, pentaerythritol tetra (meth)acrylate, pentaerythritol tri(meth)acrylate, dipentaerythritol hexa(meth)acrylate, dipentaerythritol penta(meth)acrylate, hexanediol di(meth)acrylate, trimethylolpropane tri(acryloyloxypropyl)ether, tri(acryloyloxyethyl)isocyanurate, tri(acryloyloxyethyl)cyanurate, glycerin tri(meth)acrylate; a polyfunctional acrylate or polyfunctional methacrylate which may be obtained by adding ethylene oxide or propylene oxide to a polyfunctional alcohol such as trimethylolpropane or glycerin and converting the adduct into a (meth)acrylate.

Examples of the polymerizable monomer and the polymerizable oligomer further include urethane acrylates as described in JP-B-48-41708, JP-B-50-6034, and JP-A-51-37193; polyester acrylates as described in JP-A-48-64183, JP-B-49-43191, and JP-B-52-30490; and polyfunctional acrylates or polyfunctional methacrylates such as an epoxy acrylate which is a reaction product of an epoxy resin and (meth)acrylic acid.

Among these, trimethylolpropane tri(meth)acrylate, pentaerythritol tetra(meth)acrylate, dipentaerythritol hexa(meth)acrylate, and dipentaerythritol penta(meth)acrylate are preferable.

Further, other than the above, "polymerizable compound B" described in JP-A-11-133600 can be mentioned as a preferable example.

These monomers or oligomers may be used singly or as a mixture of two or more kinds thereof. The content of the monomer or the oligomer is generally in a range of 5 mass % to 50 mass %, preferably 10 mass % to 40 mass %, based on the total solid content in the colored resin composition.

(3) Photopolymerization Initiator or Photopolymerization Initiator System

Examples of the photopolymerization initiator or the photopolymerization initiator system (in the present specification, the term "photo-polymerization initiator system" means a polymerization initiating mixture that exhibits a function of photo-polymerization initiation with a plurality of compounds combined with each other) include vicinal polyketaldonyl, compounds disclosed in U.S. Pat. No. 2,367,660, acyloin ether compounds described in U.S. Pat. No. 2,448,828, aromatic acyloin compounds substituted by an α-hydrocarbon described in U.S. Pat. No. 2,722,512, polynuclear quinone compounds described in U.S. Pat. No. 3,046,127 and U.S. Pat. No. 2,951,758, combinations of triarylimidazole dimer and p-aminoketone described in U.S. Pat. No. 3,549,367, benzothiazole compounds and trihalomethyl-s-triazine compounds described in JP-B-51-48516, trihalomethyl-triazine compounds described in U.S. Pat. No. 4,239,850, and trihalomethyloxadiazole compounds described in U.S. Pat. No. 4,212,976. In particular, trihalomethyl-s-triazine, trihalomethyloxadiazole, and triarylimidazole dimer are preferable.

In addition, "polymerization initiator C" described in JP-A-11-133600 can also be mentioned as preferable examples.

These photopolymerization initiators and photopolymerization initiator systems each may be used singly. Alternatively, a mixture of two or more selected from these photopolymerizable initiators and photopolymerization initiator systems may be used. In particular, it is preferable to use two or more selected from photopolymerizable initiators and photopolymerization initiator systems. When two or more selected from photopolymerizable initiators and photopolymerization initiator systems are used, the display property, particularly evenness of display, can be improved.

As to the content of the photo-polymerization initiator and the photo-polymerization initiator systems, the content is generally in the range of 0.5 to 20 mass %, preferably 1 to 15 mass %, based on the total solid content in the colored resin composition.

The photosensitive resin layer preferably contains an appropriate surfactant, from the viewpoint of effectively preventing non-uniformity. Any surfactants are applicable so far as they are miscible with the photosensitive resin composition. Surfactants preferably applicable to the present invention include those disclosed in paragraphs (0090) to (0091) in JP-A-2003-337424, paragraphs (0092) to (0093) in JP-A-2003-177522, paragraphs (0094) to (0095) in JP-A-2003-177523, paragraphs (0096) to (0097) in JP-A-2003-177521, paragraphs (0098) to (0099) in JP-A-2003-177519, paragraphs (0100) to (0101) in JP-A-2003-1775.20, paragraphs (0102) to (0103) in JP-A-11-133600 and those disclosed as the invention in JP-A-6-16684. In order to obtain higher effects, it is preferable to use any of fluorine-containing surfactants and/or silicon-base surfactants (fluorine-containing surfactant, or, silicon-base surfactant, and surfactant containing both of fluorine atom and silicon atom), or two or more surfactants selected therefrom, wherein the fluorine-containing surfactant is most preferable. When the fluorine-containing surfactant is used, the number of fluorine atoms contained in the fluorine-containing substituents in one surfactant molecule is preferably 1 to 38, more preferably 5 to 25, and most preferably 7 to 20. Too large number of fluorine atoms degrades the solubility in general fluorine-free solvents and thus is undesirable. Too small number of fluorine atoms does not provide effects of improving the non-uniformity and thus is undesirable.

Particularly preferable surfactants can be those containing a copolymer which includes the monomers represented by formula (a) or (b) below, having the ratio of mass of formula (a)/formula (b) of 20/80 to 60/40.

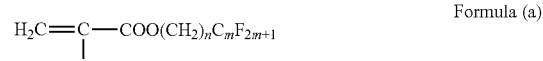

Formula (a)

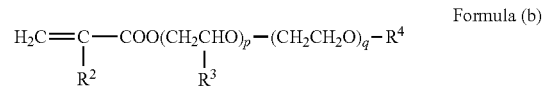

Formula (b)

In the formulae, $R^1$, $R^2$ and $R^3$ independently represent a hydrogen atom or a methyl group, $R^4$ represents a hydrogen atom or an alkyl group having 1 to 5 carbon atoms. n represents an integer of 1 to 18, and m represents an integer of 2 to 14. p and q represents integers from 0 to 18, excluding the case where both of p and q are 0.

It is to be defined now that a monomer represented by formula (a) and a monomer represented by formula (b) of the particularly preferable surfactants are denoted as monomer (a) and monomer (b), respectively. $C_mF_{2m+1}$ in formula (a) may be straight-chained or branched. m represents an integer of 2 to 14, and is preferably an integer of 4 to 12. Content of $C_mF_{2m+1}$ is preferably 20 to 70% by mass, and more preferably 40 to 60% by mass, of monomer (a). $R^1$ represents a hydrogen atom or a methyl group. n represents 1 to 18, and more preferably 2 to 10. $R^2$ and $R^3$ in formula (b) independently represent a hydrogen atom or a methyl group, and $R^4$ represents a hydrogen atom or an alkyl group having 1 to 5 carbon atoms. p and q respectively represent integers of 0 to 18, excluding the case where both of p and q are 0. p and q are preferably 2 to 8.

The monomer (a) contained in one particularly preferable surfactant molecule may be those having the same structure, or having structures differing within the above-defined range. The same can also be applied to the monomer (b).

The weight-average molecular weight Mw of a particularly preferable surfactant preferably falls in the range from 1,000 to 40,000, and more preferably from 5,000 to 20,000. The surfactant characteristically contains a copolymer composed of the monomers expressed by formula (a) and formula (b), and having the ratio of mass of monomer (a)/monomer (b) of 20/80 to 60/40. Hundred parts by weight of a particularly preferable surfactant is preferably composed of 20 to 60 parts by weight of monomer (a), 80 to 40 parts by weight of monomer (b), and residual parts by weight of other arbitrary monomers, and more preferably. 25 to 60 parts by weight of monomer (a), 60 to 40 parts by weight of monomer (b), and residual parts by weight of other arbitrary monomer.

Copolymerizable monomers other than monomers (a) and (b) include styrene and derivatives or substituted compounds thereof including styrene, vinyltoluene, α-methylstyrene, 2-methylstyrene, chlorostyrene, vinylbenzoic acid, sodium vinylbenzene sulfonate, and aminostyrene; dienes such as butadiene and isoprene; and vinyl-base monomers such as acrylonitrile, vinylethers, methacrylic acid, acrylic acid, itaconic acid, crotonic acid, maleic acid, partially esterified maleic acid, styrene sulfonic acid, maleic anhydride, cinnamic acid, vinyl chloride and vinyl acetate.

A particularly preferable surfactant is a copolymer of monomer (a), monomer (b) and so forth, allowing monomer sequence of random or ordered, such as forming a block or graft, while being not specifically limited. A particularly preferable surfactant can use two or more monomers differing in the molecular structure and/or monomer composition in a mixed manner.

Content of the surfactant is preferably adjusted to 0.01 to 10% by mass to the total amount of solid content of the photosensitive resin layer, and more preferably to 0.1 to 7% by mass. The surfactant contains predetermined amounts of a surfactant of a specific structure, ethylene oxide group and polypropylene oxide group. Therefore, addition of the surfactant at an amount within a specific range to the photosensitive resin layer enables non-uniformity to reduce in the display on the liquid crystal display device provided with the photosensitive resin layer. When the content is too small to the total amount of solid components, the non-uniformity in the display is not reduced, and when the content is too large, the effect of reducing the non-uniformity in the display is saturated. Production of the color filter while adding the particularly preferable surfactant described in the above to the photosensitive resin layer is preferable in terms of improving the non-uniformity in the display.

Preferable specific examples of fluorine base surfactant include the compounds described in paragraphs (0054) to (0063) in JP-A-2004-163610. The commercial surfactants listed below may also be used directly. As applicable commercial surfactants, examples include fluorine-containing surfactants such as Eftop EF301, EF303 (products of Shin-Akita Kasei K. K.), Florade FC430, 431 (products of Sumitomo 3M Co., Ltd.), Megafac F171, F173, F176, F189, $R^{08}$ (products of Dainippon Ink and Chemicals, Inc.), Surflon S-382, SC101, 102, 103, 104, 105, 106 (products of Asahi Glass Co., Ltd.), and silicon-base surfactants. Also polysiloxane polymer KP-341 (product of Shin-Etsu Chemical Co., Ltd.) and Troysol S-366 (product of Troy Chemical Industries, Inc.) may be used as the silicon-base surfactants. The compounds disclosed in paragraphs (0046) to (0052) in JP-A-2004-331812, which are fluorine-containing surfactants not containing the monomer represented by formula (a) also preferably used.

(Dynamic Property Control Layer)

Between the temporary support and the optically anisotropic layer of the transferring material, a dynamic property control layer to control mechanical characteristics and conformity to irregularity may be preferably provided. The dynamic property control layer preferably exhibit flexible elasticity, is softened by heat, or fluidize by heat. A thermoplastic resin layer is particularly preferred for the dynamic property control layer. The component used in the thermoplastic resin layer is preferably an organic polymer substance described in JP-A-5-72724. The substance can be preferably selected from organic polymer substances having a softening point of about 80° C. or lower according to the Vicat method (specifically, the method of measuring a polymer softening point according to American Material Test Method ASTMD 1235). More specifically, examples include: a polyolefin such as polyethylene or polypropylene; an ethylene copolymer such as a copolymer of ethylene and vinyl acetate or a saponified product thereof; a copolymer of ethylene and acrylic acid ester or a saponified product thereof; polyvinyl chloride; a vinyl chloride copolymer such as a copolymer of vinyl chloride and vinyl acetate or a saponified product thereof; polyvinylidene chloride; a vinylidene chloride copolymer; polystyrene; a styrene copolymer such as a copolymer of styrene and (meth)acrylic acid ester or a saponified product thereof; polyvinyl toluene; a vinyltoluene copolymer such as a copolymer of vinyltoluene and (meth)acrylic acid ester or a saponified product thereof; poly(meth)acrylic acid ester; a (meth)acrylic acid ester copolymer such as a copolymer of butyl (meth)acrylate and vinyl acetate; and a polyamide resin such as a vinyl acetate copolymer nylon, a copolymerized nylon, N-alkoxymethylated nylon, and N-dimethylaminated nylon.

(Delamination Layer)

The birefringence pattern builder used as a transferring material may include a delamination layer on the temporary support. The delamination layer controls the adhesion between the temporary support and the delamination layer or between the delamination layer and the layer laminated immediately above, and takes a role of helping the separation of the temporary support after the transfer of the optically anisotropic layer. The above-mentioned other functional layers such as the alignment layer and the dynamic property control layer may function as the delamination layer.

The transferring material preferably has an intermediate layer for the purpose of preventing mixing of the components during coating of a plurality of layers and during storage after the coating. The oxygen shut-off film having an oxygen shut-off function described as "separation layer" in JP-A No. 5-72724 or the above-described orientation layer for generating optical anisotropy is preferably used as the intermediate layer. Particularly preferably among them is a layer containing a mixture of polyvinylalcohol or polyvinylpyrrolidone and one or more derivatives thereof. One layer may work simultaneously as the above thermoplastic resin layer, oxygen shut-off layer, and alignment layer.

(Surface Protecting Layer)

A thin surface protecting layer is preferably provided on the resin layer for protecting the above layers against contamination or damage upon storage. The property of the surface protecting layer is not particularly limited and the surface protecting layer may be formed of the same or a similar material to that of the temporary layer. The surface protecting layer should be readily separated from the layer adjacent thereto (for example an adhesive layer for transfer). As the material for the surface protecting layer, silicon paper, polyolefin, or polytetrafluoroethylene sheet is suitable.

The individual layers of the optically anisotropic layer, photosensitive resin layer, adhesive layer for transfer, and optionally-formed alignment layer, thermoplastic resin layer, dynamic property control layer, and intermediate layer can be formed by coating such as dip coating, air knife coating, spin coating, slit coating, curtain coating, roller coating, wire bar coating, gravure coating and extrusion coating (U.S. Pat. No. 2,681,294). Two or more layers may be coated simultaneously. Methods of simultaneous coating is described in U.S. Pat. Nos. 2,761,791, 2,941,898, 3,508,947, 3,526,528, and in "Kotingu Kogaku (Coating Engineering), written by Yuji Harazaki, p. 253, published by Asakura Shoten (1973).

When the layer immediately above the optically anisotropic layer (for example, the adhesive layer for transfer) is applied to the optically anisotropic layer, the coating solution may be added with a plasticizer or a photopolymerization initiator. Thereby, the modification of the layer may be conducted simultaneously by penetration of these additives.

(Method of Transferring Transferring Material to Target Transfer Material)

Methods of transferring the transferring material on a target transfer material are not specifically limited, so far as the optically anisotropic layer can be transferred onto the target transfer material such as a support (substrate). For example, the transferring material in a film form may be attached to the substrate so that the surface of the adhesive layer for transfer is faced to the surface of the target transfer material, then pressing under heating or no-heating with rollers or flat plates, which are heated and/or pressed by a laminator. Specific examples of the laminator and the method of lamination include those described in JP-A-7-110575, JP-A-11-77942, JP-A-2000-334836 and JP-A-2002-148794, wherein the method described in JP-A-7-110575 is preferable in terms of low contamination.

Examples of the target transfer material include a support, a laminated structure which is comprised of a support and another functional layer, and a birefringence pattern builder.

(Steps Included in Transfer)

The temporary support may be separated or not be separated after the transfer of a birefringence pattern builder on the target transfer material. When the temporary support is not separated, the temporary support preferably has transparency suited for the patterned light exposure afterwards and heat-resistance sufficient for surviving the baking step. A step for removing unwanted layers which has been transferred with the optically anisotropic layer may be included in the method. For example, when polyvinyl alcohol/polyvinylpyrolidone copolymer is used in the alignment layer, the alignment layer and the layers above can be removed by development with an aqueous weak alkaline developing solution. Methods of the development may be any of known methods such as paddle development, shower development, shower-and-spin development and dipping development. The temperature of the developing solution is preferably 20° C. to 40° C., and pH of the developing solution is preferably 8 to 13.

Other layer may be formed on the surface remained after the separation of the temporary layer or the removal of the unwanted layers, according to need. Another transferring material may be transferred on the surface remained after the separation of the temporary layer or the removal of the unwanted layers, according to need. The transferring material may be the same or different from the previously transferred transferring material. Further, the slow axis of the optically anisotropic layer in the first transferred transferring material may be in the same or different direction from that of the slow axis of the optically anisotropic layer in the second transferred transferring material. As described above, transferring plural optically anisotropic layers is useful for production of a birefringence pattern having large retardation with plural optically anisotropic layers stacked so as that the directions of the slow axes are the same, and a specific birefringence pattern with plural optically anisotropic layers stacked so as that the directions of the slow axes are different to each other.

(Production of Patterned Birefringent Product)

A patterned birefringent product can be produced by subjecting the birefringence pattern builder to at least patterned light exposure and heating (baking) in this order.

(Patterned Light Exposure)

In the present specification, the pattern exposure means exposure in which only partial region of the birefringent pattern builder is exposed. The method of patterned light exposure may be a contact light exposure using a mask, proximity light exposure, projected light exposure, or direct drawing by focusing on the predetermined point by using laser or electron beam without a mask.

The irradiation wavelength of the light source for the light exposure preferably has a peak in the range of 250 to 450 nm, and more preferably in the range of 300 to 410 nm. Specific examples of the light source include extra-high voltage mercury lamp, high voltage mercury lamp, metal halide lamp, and blue laser. Energy of exposure generally falls in the range preferably from about 3 mJ/cm$^2$ to about 2000 mJ/cm$^2$, more preferably from about 5 mJ/cm$^2$ to about 1,000 mJ/cm$^2$, and further preferably from about 10 mJ/cm$^2$ to about 500 mJ/cm$^2$.

(Exposure Condition for Pattern Exposure)

The production method of the present invention is characterized in that exposure operations (pattern exposure) different in exposure condition from each other are performed in two or more regions of a birefringent pattern builder. Herein, the "two or more regions" may have mutually overlapping regions, but preferably have no mutually overlapping region. The pattern exposure may be performed by a plurality of exposures, or by single exposure by using, for example, a mask having two or more regions having transmission spectra different from each other, or alternatively by exposure in combination thereof. The production method of the present invention is thus characterized in that the exposure is performed in such a manner that two or more exposure regions are exposed under different exposure conditions upon pattern exposure.

Examples of the parameters of the exposure conditions include, but are not particularly limited thereto, exposure peak wavelength, exposure intensity, exposure time period, exposure quantity, exposure temperature, exposure atmosphere, and the like. Among them, exposure peak wavelength, exposure intensity, exposure time period, and exposure quantity are preferable, and exposure intensity, exposure time period, and exposure quantity are more preferable, from the viewpoints of convenience in adjusting the conditions. Regions exposed under different exposure conditions upon pattern exposure have, after baking, different birefringence, in particular different retardation values, that are controlled by the exposure conditions. It is thus possible to produce birefringence patterns having desired retardation values which are different from each other between the regions after baking, by adjusting the exposure condition at the respective region upon pattern exposure. The exposure condition for the two or more exposure regions exposed under different exposure conditions may be changed discontinuously or continuously.

(Mask Exposure)

Exposure by using an exposure mask is useful as a means for forming exposure regions different in exposure conditions. For example, it is possible to change readily the exposure conditions between the region subjected to the first time exposure and the region subjected to the second time exposure, by exposing first only one region by using an exposure mask, and then exposing second the other region or the entire surface by using another mask, while the temperature, atmosphere, exposure intensity, exposure time period, or exposure wavelength is changed from that in the first time exposure. A mask having two or more regions respectively showing different transmission spectra is particularly useful as the mask for modifying the exposure intensity or the exposure wavelength. In that case, multiple regions may be exposed to light under conditions different in exposure intensity or exposure wavelength from each other, only by a single exposure operation. It is of course possible to obtain different exposure quantities by subjecting to exposure for the same time period under different exposure intensities.

If scanning exposure, for example, with laser is used, it is possible to change the exposure conditions in the respective regions, for example, by changing the light source intensity or the scanning speed depending on the exposure regions.

Further, the method of the present invention may be combined with the steps, in which another transferring birefringence pattern builder is transferred on the laminated structure obtained by conducting patterned light exposure to a birefringence pattern builder, and then another patterned light exposure is conducted. The retardation values retained after baking can be effectively changed among the region which is a non-light-exposed region both in the first and second exposures (generally having the lowest retardation value), the region which is a light-exposed region in the first exposure but a non-light-exposed region in the second exposure, and the region which is a light-exposed region both in the first and second exposures (generally having the highest retardation value). On the other hand, the region which is unexposed at the first time but is exposed at the second time is considered to be equal, upon the second time, to the region which is exposed at both the first and second times. In a similar manner, four or more regions can be readily formed, by conducting transfer and patterned light exposure alternately three, four or more times. The above-mentioned method is useful when the different regions desirably have a difference (such as a difference in the direction of optical axis or very large difference in retardation) that cannot be provided only by modification of the exposure conditions.

{Heating (Baking)}

Birefringence pattern can be produced by applying heat to the birefringence pattern builder after patterned light exposure at 50 to 400° C., preferably at 80 to 400° C.

Alternatively, another transferring material for producing birefringence pattern builder may be transferred on the birefringence pattern builder which has been baked, and then a patterned light exposure and baking may be conducted thereon. In such a case, it is possible to change the retardation value remaining after the second baking quite effectively, with a proper combination of the first and second exposure conditions. This method is useful when two regions having birefringence of different slow-axis directions to each other are needed to be formed without overlap to each other.

(Functional Layer to be Laminated on Birefringence Pattern)

Birefringence pattern builder can be subjected to exposure and baking as described in the above to obtain birefringence pattern, which can be then laminated with functional layers with various functions to thereby obtain a patterned birefringent product. Examples of the functional layer include, but not specifically limited to, hardcoat layer for preventing damage or scratches on the surface, and reflective layer which renders the birefringence pattern readily visible. For an easy identification of the pattern, a reflective layer is particularly preferred to be provided under the birefringence pattern.

(Patterned Birefringent Product)

The product obtained by conducting light exposure and baking as above to the birefringence pattern builder is normally colorless and transparent, but when it is sandwiched by two polarizing plates, or by one polarizing plate and one reflective layer, the product exhibits characteristic contrast or color, and becomes readily identifiable with the naked eye. Using this property, the patterned birefringent product obtained by the above method can be used as, for example, means for preventing forgery. That is, the patterned birefringent product obtained by the method of the present invention, especially the patterned birefringent product having a reflective layer is normally almost invisible with the naked eye, whereas, through a polarizing plate, the patterned birefringent product can exhibit multi-colored image which can be readily identified. A copy of the birefringence pattern without any polarizing plate exhibits no image, whereas a copy through a polarizing plate exhibits a permanent pattern which is visible with the naked eye without any polarizing plate. Therefore, the reproduction of the birefringence pattern is difficult. Such kind of method of producing birefringence pattern is not widely spread, and needs unusual or special kind of material. Therefore, the production method and product of the present invention can be considered to be favorably adapted as means of preventing forgery.

(Optical Element)

The patterned birefringent product obtained by the above method can be also used as an optical element. For example, when the patterned birefringent product obtained by the above method is used as a structural optical element, a particular optical element which exhibit effects only against a specific polarized light can be produced. As an example, a diffraction grating produced with the birefringence pattern according to the present invention functions as a polarization separation device which strongly diffracts a specific polarized light, and can be applied to as a projector or an optical communication device.

EXAMPLES

The present invention will be described in more detail based on the following examples. Any materials, reagents, amount and ratio of use and operations, as shown in the examples, may appropriately be modified without departing from the spirit and scope of the present invention. It is therefore understood that the present invention is by no means intended to be limited to the specific examples below.

Herein, in the specification and the drawings, the unit of a physical amount/quantity is shown in parenthesis "( )" or after slush "/" following the description of the physical amount/quantity.

Example 1

Preparation of Birefringent Pattern Builder and Preparation of Birefringent Samples Having a Desired Retardation by Using the Same (Preparation of Coating Liquid CU-1 for Dynamic Property Control Layer)

The composition below was prepared, filtered through a polypropylene filter having a pore size of 30 μm, and the filtrate was used as coating liquid CU-1 for forming a dynamic property control layer.

B-1 was a copolymer of methyl methacrylate, 2-ethylhexyl acrylate, benzyl methacrylate and methacrylic acid, having a copolymerization composition ratio (molar ratio) of 55/30/10/5, a mass-average molecular mass of 100,000, and a Tg of about 70° C.

B-2 was a copolymer of styrene and acrylic acid having a copolymerization composition ratio (molar ratio) of 65/35, a mass-average molecular mass of 10,000, and a Tg of about 100° C.

| Composition of Coating Liquid for Dynamic Property Control Layer | (% by mass) |
|---|---|
| Binder (B-1) | 5.89 |
| Binder (B-2) | 13.74 |
| BPE-500 (trade name, manufactured by Shin-Nakamura Chemical Co., Ltd.) | 9.20 |
| Megafac F-780F (manufactured by Dainippon Ink & Chemicals Incorporation) | 0.55 |
| Methanol | 11.22 |
| Propylene glycol monomethyl ether acetate | 6.43 |
| Methyl ethyl ketone | 52.97 |

(Preparation of Coating Liquid AL-1 for Alignment Layer)

The composition below was prepared, filtered through a polypropylene filter having a pore size of 30 μm, and the filtrate was used as coating liquid AL-1 for forming an alignment layer.

| Composition of Coating Liquid AL-1 for Alignment layer | (% by mass) |
|---|---|
| Polyvinyl alcohol (trade name: PVA205, manufactured by Kuraray Co., Ltd.) | 3.21 |
| Polyvinylpyrrolidone (trade name: Luvitec K30, manufactured by BASF) | 1.48 |
| Distilled water | 52.10 |
| Methanol | 43.21 |

(Preparation of Coating Liquid LC-1 for Optically Anisotropic Layer)

The composition below was prepared, filtered through a polypropylene filter having a pore size of 0.2 μm, and the filtrate was used as coating liquid LC-1 for forming an optically anisotropic layer.

LC-1-1 is a liquid crystalline compound having two reactive groups, one of which is acrylic group, i.e. a radically reactive group, and the other of which is oxetanyl group, i.e. a cationically reactive group.

LC-1-2 is a disk-shaped compound added for the purpose of orientation control. LC-1-2 was synthesized according to the method described in Tetrahedron Lett., Vol. 43, p. 6793 (2002).

| Composition of Coating Liquid for Optically Anisotropic Layer | (% by mass) |
|---|---|
| Rod-like liquid crystal (LC-1-1) | 32.59 |
| Horizontal orientation agent (LC-1-2) | 0.02 |
| Cationic photopolymerization initiator (trade name:,CPI100-P, SAN-APRO Co., Ltd.) | 0.66 |
| Polymerization control agent (trade name: IRGANOX1076, Chiba Speciality Chemicals Co., Ltd.) | 0.07 |
| Methyl ethyl ketone | 66.66 |

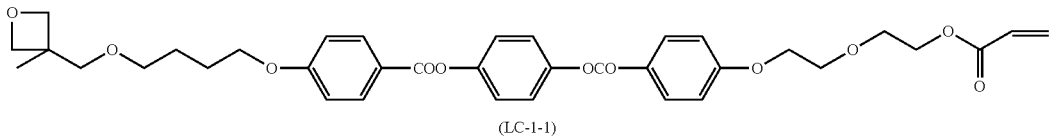

(LC-1-1)

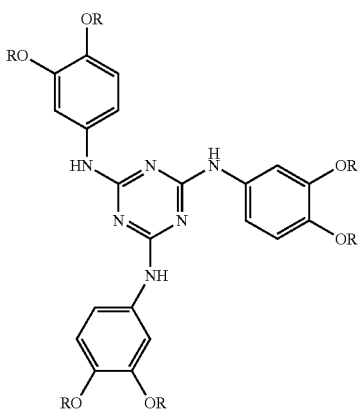

R = CH$_2$CH$_2$OCH$_2$CH$_2$C$_6$F$_{13}$
(LC-1-2)

(Preparation of Coating Liquid AD-1 for Adhesive Layer for Transfer)

The composition below was prepared, filtered through a polypropylene filter having a pore size of 0.2 μm, and the filtrate was used as coating liquid AD-1 for forming an adhesive layer for transfer.

B-3 was a copolymer of benzyl methacrylate, methacrylic acid, and methyl methacrylate, having a copolymerization composition ratio. (molar ratio) of 35.9/22.4/41.7, and a mass-average molecular mass of 38,000.

As the RPI-1, use was made of 2-trichloromethyl-5-(p-styrylstyryl)-1,3,4-oxadiazole.

| Composition of Coating Liquid for Adhesive Layer for Transfer | (% by mass) |
|---|---|
| Binder (B-3) | 8.05 |
| KAYARAD DPHA (trade name, manufactured by Nippon Kayaku) | 4.83 |
| Radical photopolymerization initiator (RPI-1) | 0.12 |
| Hydroquinone monomethyl ether | 0.002 |
| Megafac F-176PF (trade name, manufactured by Dainippon Ink & Chemicals Incorporation) | 0.05 |
| Propylene glycol monomethyl ether acetate | 34.80 |
| Methyl ethyl ketone | 50.538 |
| Methanol | 1.61 |

(Production of Sample TRC-1 Coated with Optically Anisotropic Layer and Transferring Material TR-1 for Producing Birefringence Pattern)

To the surface of a temporary support formed of a 100-μm-thick polyethylene terephthalate film with easily adhesible property (COSMOSHINE A4100 (trade name) from Toyobo Co., Ltd.), the coating liquid for a dynamic property control layer, CU-1, and the coating liquid for an alignment layer, AL-1, in this order were applied by using a wire bar coater and dried. The obtained layers had dry film thickness of 14.6 μm and 1.6 μm, respectively. Next the coating liquid for optically anisotropic layer, LC-1, was applied to the surface using a wire bar coater, dried under heating at 90° C. on the surface of the film for 2 minutes, to thereby obtain a layer of a liquid crystal phase. The coated layer was then illuminated in the air atmosphere by ultraviolet radiation by using a 160 W/cm, air-cooled metal halide lamp (product of Eyegraphics Co., Ltd.), so as to fix the alignment state of the phase to thereby obtain a 3.5-μm-thick optically anisotropic layer to produce sample TRC-1 coated with the optically anisotropic layer. The ultraviolet ray used was 100 mW/cm$^2$ illuminance in the range of UV-A (integrated value in the wavelength between 320 nm and 400 nm), and 80 mJ/cm$^2$ irradiation energy in the range of UV-A. The optically anisotropic layer in the sample TRC-1 was formed of polymer which was solid at 20° C., and presented MEK (methyl ethyl ketone)-resistance. Finally, the coating liquid fox adhesive layer for transfer, AD-1, was applied to surface of the sample TRC-1, dried to obtain an adhesive layer for transfer of 1.2-μm-thick, which was then pressure-bonded with a protective film (a 12-μm-thick polypropylene film), to thereby obtain transferring material TR-1 for producing birefringence pattern.

(Production of Birefringence Pattern Builder BPM-1)

A non-alkali glass substrate was cleaned using a rotating nylon-haired brush while spraying a glass cleaner solution conditioned at 25° C. by a shower for 20 seconds. After showered with purified water, the substrate was sprayed with a silane coupling solution (0.3% aqueous solution of N-β-(aminoethyl)-γ-aminopropyl trimethoxysilane, trade name: KBM-603, Shin-Etsu Chemical Co., Ltd.) by a shower for 20 seconds, and then cleaned with a shower of purified water, to obtain silane-treated glass. The above-described transferring material for producing birefringence pattern, TR-1, after being separated from its protective film, was laminated onto the silane-treated glass preheated at 105° C. for 2 minutes by using a laminator (product of Hitachi Industries Co., Ltd. (model Lamic II)) under a roller temperature of 130° C., a line pressure of 100 N/cm, and a travel speed of 1.4 m/min. After the lamination, the temporary support was delaminated to obtain the birefringence pattern builder BPM-1.

(Measurement of Retardation)

With respect to the birefringence pattern builder BPM-1, frontal retardation (Re (0)) of at an wavelength 550 nm was measured using a fiber-type spectrometer based on the parallel Nicol method. The result of the retardation measurement is shown in Table 1.

TABLE 1

| Sample | Re(0)/nm |
|---|---|
| BPM-1 | 263.0 |

(Comparison of Samples Prepared at Different Exposure Quantities)

Subsequently, a birefringent pattern builder BPM-1 was exposed to light under different conditions A to K by using M-3L mask aligner manufactured by Mikasa and baked in a clean oven at 230° C. for 1 hour, to give samples BP-1A to BP-1K for evaluation of exposure quantity dependence. As for the exposure condition, the exposure quantity was altered by changing the exposure time period, while the exposure intensity was kept constant at 6.25 mW/cm$^2$. The exposure time periods, the exposure quantities, and the results obtained by measuring the retardation of the respective samples after baking are shown in Table 2, while a graph showing the relationship between the exposure quantity and the retardation is shown in FIG. 4.

TABLE 2

| Sample | Exposure period/sec | Exposure quantity/ mJ/cm$^2$ | Re(0)/nm |
|---|---|---|---|
| BP-1A | 0 (No exposure) | 0.0 | 0.5 |
| BP-1B | 0.6 | 3.8 | 40.0 |
| BP-1C | 1.2 | 7.5 | 99.1 |
| BP-1D | 1.8 | 11.3 | 156.0 |
| BP-1E | 2.4 | 15.0 | 185.2 |
| BP-1F | 3.6 | 22.5 | 237.1 |
| BP-1G | 6.0 | 37.5 | 278.2 |
| BP-1H | 9.0 | 56.3 | 297.5 |
| BP-1I | 12.0 | 75.0 | 315.0 |
| BP-1J | 20.0 | 125.0 | 317.6 |
| BP-1K | 30.0 | 188.0 | 320.5 |

As shown in the Table and the Figure, the retardation of unexposed sample after baking was almost zero, and the retardation after baking increased as the exposure quantity was raised and was saturated at a certain level of the exposure quantity (100 mJ/cm$^2$ in present Example) or more. By applying an appropriate exposure quantity based on the data in FIG. 4, it is possible to control the retardation of the sample after baking within a range not larger than the saturation value. It is thus possible to obtain a sample having an arbitrary retardation pattern (at a retardation not larger than the saturation value), by using the birefringent pattern builder and the production method (pattern exposure at a suitable exposure quantity and baking) according to the present invention.

Example 2

Preparation of Birefringent Samples of which the Relationship Between Exposure Quantity and Post-Baking Retardation was Adjusted by Modification of the Concentration of the Photopolymerization Initiator in the Adhesive Layer for Transfer (Preparation of Coating Liquids AD-2 and AD-3 for Adhesive Layer for Transfer)

Coating Liquids AD-2 and AD-3 for adhesive layer for transfer, in which the concentration of the photopolymerization initiator was altered from that in AD-1, were newly prepared and used after they were filtered through a polypropylene filter having a pore size of 0.2 µm. The formulations of AD-2 and AD-3 as well as that of AD-1 for comparison are shown in Table 3. The formulation AD-2 had a photopolymerization initiator concentration lower, while the formulation AD-3 had a photopolymerization initiator concentration higher than that of the formulation AD-1.

TABLE 3

| Composition of coating liquid (% by mass) | Name of formulation | | |
|---|---|---|---|
|  | AD-1 | AD-2 | AD-3 |
| Binder (B-3) | 8.05 | 8.09 | 8.01 |
| KAYARAD DPHA (trade name, manufactured by Nippon Kayaku) | 4.83 | 4.85 | 4.81 |
| Radical photopolymerization initiator (RPI-1) | 0.12 | 0.06 | 0.18 |
| Hydroquinone monomethyl ether | 0.002 | 0.002 | 0.002 |
| Megafac F-176PF (trade name, manufactured by Dainippon Ink & Chemicals Incorporation) | 0.05 | 0.05 | 0.05 |
| Propylene glycol/monomethyl ether acetate | 34.80 | 34.80 | 34.80 |
| Methyl ethyl ketone | 50.538 | 50.538 | 50.538 |
| Methanol | 1.61 | 1.61 | 1.61 |

(Preparation of Transferring Materials TR-2 and TR-3 for Producing Birefringence Pattern and Birefringent Pattern Builders BPM-2 and BPM-3)

Transferring materials TR-2 and TR-3 for producing birefringence pattern were prepared in the same manner to TR-1, except that the coating liquid AD-1 for adhesive layer for transfer was replaced with the coating liquid AD-2 or AD-3. Further, birefringent pattern builders BPM-2 and BPM-3 were prepared in the same manner to BPM-1, except that the transferring material TR-1 for producing birefringence pattern was replaced with the transferring material TR-2 or TR-3.

(Measurement of Retardation)

With respect to the birefringence pattern builders BPM-2 and BPM-3, frontal retardation Re (0) of at a wavelength 550 nm was measured using a fiber-type spectrometer based on the parallel Nicol method. The results of retardation measurement are shown in comparison with that of BPM-1 in Table 4.

TABLE 4

|  | BPM-1 (Initiator 0.12%) | BPM-2 (Initiator 0.06%) | BPM-3 (Initiator 0.18%) |
|---|---|---|---|
| Sample | 263.0 | 262.9 | 260.5 |

(Comparison of Exposure Quantity and Post-Baking Retardation)

Subsequently, the birefringent pattern builders BPM-2 and BPM-3 were exposed to light under different exposure quantities in the same manner to Example 1 by using M-3L mask aligner manufactured by Mikasa and then baked in a clean oven at 230° C. for 1 hour, to give samples for measurement of exposure quantity dependence. As for the exposure condition, the exposure quantity was altered by changing the exposure time period, while the exposure intensity was kept constant at 6.25 mW/cm$^2$. The exposure quantities and the results obtained by measuring the retardation, of the respective samples after baking are shown in Table 5, while a graph showing the relationship between the exposure quantity and the retardation is shown in FIG. 5. The concentrations of the photopolymerization initiator in the coating liquids for adhesive layer for transfer used in preparation of the respective materials are also shown in the table.

TABLE 5

| Exposure quantity/ mJ/cm$^2$ | Re (0)/nm | | |
|---|---|---|---|
|  | BPM-1 (Initiator 0.12%) | BPM-2 (Initiator 0.06%) | BPM-3 (Initiator 0.18%) |
| 0.0 | 0.5 | 1.2 | 0.7 |
| 3.8 | 40.0 | 17.4 | 53.9 |
| 7.5 | 99.1 | 47.7 | 122.5 |
| 11.3 | 156.0 | 75.1 | 189.0 |
| 15.0 | 185.2 | 106.9 | 224.7 |
| 22.5 | 237.1 | 139.6 | 263.7 |
| 37.5 | 278.2 | 195.4 | 284.7 |
| 56.3 | 297.5 | 241.2 | 291.6 |
| 75.0 | 315.0 | 251.7 | 287.1 |
| 125.0 | 317.6 | 266.0 | 294.8 |
| 188.0 | 320.5 | 276.8 | 305.7 |

The results in the Table and the Figure show that it is possible to adjust the relationship between the pre-baking exposure quantity and the post-baking retardation of each sample by modifying the formulation of the coating liquid for adhesive layer for transfer (i.e. the concentration of photopolymerization initiator in this example).

For, example, when the amount of the photopolymerization initiator in the adhesive layer for transfer is reduced, the increase in post-baking retardation caused by increase in exposure quantity becomes lower. Such a formulation containing a smaller amount of the photopolymerization initiator is useful, if accurate adjustment of the post-baking retardation is desired.

On the other hand, if the content of the photopolymerization initiator in the adhesive layer for transfer is increased, the increase in post-baking retardation caused by increase in exposure quantity becomes rapidly higher and is saturated promptly. Such a formulation containing a greater amount of the photopolymerization initiator is useful, if there is no much need for intermediate retardation and if reduction of the exposure quantity, which would also lead to shorten the exposure time period, is desired.

It is possible in this way to optimize the properties of the birefringent pattern builder by adjusting the concentration of the photopolymerization initiator in the adhesive layer for transfer according to applications.

Example 3

Preparation of Birefringent Samples of which the Relationship Between the Exposure Quantity and the Post-Baking Retardation is Modified According to the Kind of The Photopolymerization Initiator in the Adhesive Layer for Transfer (Preparation of Coating Liquid AD-4 for Adhesive Layer for Transfer)

Coating liquid AD-4 for adhesive layer for transfer, in which the kind of the photopolymerization initiator was altered from that in AD-1, was newly prepared and used after it was filtered through a polypropylene filter having a pore size of 0.2 μm. The formulation of AD-4 and that of AD-1 for comparison are shown in Table 6.

As RPI-2, use was made of 2,4-bis(trichloromethyl)-6-[4-(N,N-diethoxycarbonylmethyl)-3-bromophenyl]-s-triazine.

TABLE 6

|  | Name of formulation | |
| --- | --- | --- |
| Composition of coating liquid (% by mass) | AD-1 | AD-4 |
| Binder (B-3) | 8.05 | 8.09 |
| KAYARAD DPHA (trade name, manufactured by Nippon Kayaku) | 4.83 | 4.85 |
| Radical photopolymerization initiator (RPI-1) | 0.12 | — |
| Radical photopolymerization initiator (RPI-2) | — | 0.12 |
| Hydroquinone monomethyl ether | 0.002 | 0.002 |
| Megafac F-176PF (trade name, manufactured by Dainippon Ink & Chemicals Incorporation) | 0.05 | 0.05 |
| Propylene glycol/monomethyl ether acetate | 34.80 | 34.80 |
| Methyl ethyl ketone | 50.538 | 50.538 |
| Methanol | 1.61 | 1.61 |

(Preparation of Transferring Material TR-4 for Producing Birefringence Pattern and Birefringent Pattern Builder BPM-4)

Transferring material TR-4 for producing birefringence pattern was prepared in the same manner to TR-1, except that the coating liquid AD-1 for adhesive layer for transfer was replaced with the coating liquid AD-4. Further, birefringent pattern builder BPM-4 was prepared in the same manner to BPM-1, except that the transferring material TR-1 for producing birefringence pattern was replaced with the transferring material TR-4.

(Measurement of Retardation)

With respect to the birefringence pattern builder BPM-4, frontal retardation Re(0) of at an wavelength 550 nm was measured using a fiber-type spectrometer based on the parallel Nicol method. The result of retardation measurement is shown in comparison with that of BPM-1 in Table 4.

TABLE 7

|  | BPM-1 | BPM-4 |
| --- | --- | --- |
| Sample | 263.0 | 257.3 |

(Comparison of Exposure Quantity and Post-Baking Retardation)

Subsequently, the birefringent pattern builder BPM-4 was exposed to light under different exposure quantities in the same manner to Example 1 by using M-3L mask aligner manufactured by Mikasa and then baked in a clean oven at 230° C. for 1 hour, to give samples for measurement of exposure quantity dependence. As for the exposure condition, the exposure quantity was altered by changing the exposure time period, while the exposure intensity was kept constant at 6.25 mW/cm$^2$. The exposure quantity and the result obtained by measuring the retardation, of the respective samples after baking are summarized in Table 8, while a graph showing the relationship between the exposure quantity and the retardation is shown in FIG. 6. The kind of the photopolymerization initiator in the coating liquid for adhesive layer for transfer used in preparation of the respective materials are also shown in the Table.

TABLE 8

|  | Re (0)/nm | |
| --- | --- | --- |
| Exposure quantity/ mJ/cm$^2$ | BPM-1 (Initiator RPI-1) | BPM-4 (Initiator RPI-2) |
| 0.0 | 0.5 | 1.0 |
| 3.8 | 40.0 | 1.1 |
| 7.5 | 99.1 | 2.9 |
| 11.3 | 156.0 | 4.9 |
| 15.0 | 185.2 | 6.4 |
| 22.5 | 237.1 | 11.6 |
| 37.5 | 278.2 | 23.2 |
| 56.3 | 297.5 | 35.0 |
| 75.0 | 315.0 | 43.8 |
| 125.0 | 317.6 | 68.8 |
| 188.0 | 320.5 | 88.4 |

The results in the Table and the Figure show that it is also possible to adjust the relationship between the pre-baking exposure quantity and the post-baking retardation of each sample by modifying the kind of the photopolymerization initiator in the formulation of the coating liquid for adhesive layer for transfer. Specifically, the retardation of BPM-4, in which the kind of the photopolymerization initiator in the adhesive layer for transfer is altered, changes very gradually in proportion to the exposure quantity in the range up to (at least) 100 nm, and thus such a formulation is very useful if fine retardation adjustment in the range is desired.

It is possible in this way to optimize the properties of the birefringent pattern builder also by changing the kind of the photopolymerization initiator in the adhesive layer for transfer according to applications. It is possible to adjust the properties of the birefringent pattern builder also by adding various additives other than the photopolymerization initiator, although not described with giving specific examples.

Example 4

Preparation of Birefringent Sample by Using the Optically Anisotropic Layer Directly Formed on Support)

(Preparation of Coating Liquid LC-2 for Optically Anisotropic Layer)

The composition below was prepared, filtered through a polypropylene filter having a pore size of 0.2 μm, and the filtrate was used as coating liquid LC-2 for forming an optically anisotropic layer.

LC-2-1 is a liquid crystalline compound having two reactive groups, one of which is methacrylic group, i.e. a radically reactive group, and the other of which is oxetanyl group, i.e. a cationically reactive group.

| Composition of Coating Liquid for Optically Anisotropic Layer | (% by mass) |
|---|---|
| Rod-like liquid crystal (LC-2-1) | 32.64 |
| Horizontal orientation agent (LC-1-2) | 0.02 |
| Cationic photopolymerization initiator (trade name: Cyracure UVI6974 from Dow Chemical Company) | 0.67 |
| Methyl ethyl ketone | 66.67 |

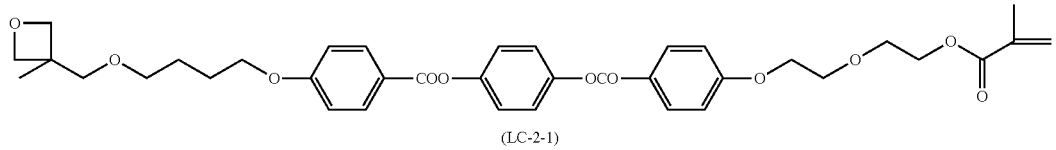

(LC-2-1)

(Preparation of Coating Liquid CL-1 for Transparent Resin Layer)

The composition below was prepared, filtered through a polypropylene filter having a pore size of 0.2 μm, and the filtrate was used as coating liquid CL-1 for forming a transparent resin layer.

B-4 was a copolymer of benzyl methacrylate and methacrylic acid, having a copolymerization composition ratio (molar ratio) of 72.0/28.0, and a mass-average molecular mass of 38,000.

| Composition of Coating Liquid for transparent resin layer | (% by mass) |
|---|---|
| Binder (B-4) | 11.57 |
| NK ESTER A-BPE-10 (trade name, manufactured by Shin-Nakamura Chemical Co., Ltd.) | 1.30 |
| Radical photopolymerization initiator (RPI-1) | 0.12 |
| Hydroquinone monomethyl ether | 0.002 |
| Megafac F-176PF (trade name, manufactured by Dainippon Ink & Chemicals Incorporation) | 0.05 |
| Methyl ethyl ketone | 86.96 |

(Preparation of Glass Carrying Oriented Film)

A nonalkali glass substrate was washed with a rotating brush of nylon hairs while a glass cleaner solution adjusted to 25° C. was sprayed by showering for 20 seconds, washed with pure water, and then, spin-coated with a polyimide-based oriented-film-preparing coating liquid (trade name: SE-410, manufactured by Nissan Chemical Industries Co., Ltd.) at a rotation speed of 5000 revolutions per min. The substrate was heated in a substrate-preheating apparatus at 100° C. for 5 minutes, baked in a clean oven at 200° C. for 1 hour, and subjected to rubbing treatment, to give a glass carrying an oriented film.

(Preparation of Birefringent Pattern Builder BPM-5 by Direct Coating on Support)

The coating liquid LC-2 for optically anisotropic layer was coated on the oriented-film-carrying glass described above with a wire bar coater and dried at a film-surface temperature of 90° C. for 2 minutes to thereby form a liquid crystal phase; ultraviolet ray was irradiated thereon in air by using an air-cooled metal halide lamp (manufactured by Eye Graphics Co., Ltd.) at 160 W/cm, so as to fix the orientation state and thus, to form an optically anisotropic layer having a thickness of 1.5 μm. The ultraviolet ray used was 50 mW/cm² illuminance in the range of UV-B (integrated value in the wavelength between 280 nm and 320 nm), and 120 mJ/cm² irradiation energy in the range of UV-B. The transparent resin layer-coating liquid CL-1 was coated and dried additionally thereon to thereby form a transparent resin layer of 1.2 μm in thickness and give a birefringent pattern builder BMP-5.

(Measurement of Retardation)

Regarding of the birefringent pattern builder BPM-5, frontal retardation Re (0) of at a wavelength 550 nm was measured using a fiber-type spectrometer based on the parallel Nicol method. The Result of the retardation measurement is shown in Table 9.

TABLE 9

| Sample | Re (0)/nm |
|---|---|
| BPM-5 | 77.0 |

(Comparison of Samples Prepared at Different Exposure Quantities)

Subsequently, a birefringent pattern builder BPM-5 was exposed to light by using M-3L mask aligner manufactured by Mikasa under different exposure quantities and baked in a clean oven at 230° C. for 1 hour, to give samples for evaluation of exposure quantity dependence. As for the exposure condition, the exposure quantity was altered by changing the exposure time period, while the exposure intensity was kept constant at 6.25 mW/cm². The exposure quantities and the results obtained by measuring the retardation, of the samples after baking, are shown in Table 10, while a graph showing the relationship between the exposure quantity and the retardation is shown in FIG. 7.

TABLE 10

| Exposure quantity/ mJ/cm² | Re (0)/nm |
|---|---|
| 0.0 | 0.4 |
| 10.0 | 28.2 |
| 20.0 | 57.4 |
| 30.0 | 71.3 |
| 40.0 | 75.5 |
| 50.0 | 73.8 |
| 60.0 | 78.9 |
| 70.0 | 85.0 |

As shown in the Table and the Figure, the method according to the present invention is also effective in a birefringent pattern builder produced by direct coating on support.

Example 5

Preparation of Birefringence Patterns Having Multiple Regions Different in Retardation by Using an Exposure Mask Having Multiple Regions Different in Density (Production of Birefringence. Pattern Builder BPM-6 of Present Invention)

A non-alkali glass substrate was washed with a rotating brush having nylon hairs while spraying a glass cleaner liquid regulated to 25° C. by a shower for 20 seconds, then the glass substrate was washed with pure water shower. Thereafter, a silane coupling solution (a 0.3 mass % aqueous solution of N-β(aminoethyl)γ-aminopropyltrimethoxysilane, trade name: KBM-603, manufactured by Shin-Etsu Chemical Co., Ltd.) was sprayed for 20 seconds by a shower, and the substrate was washed with a pure water shower, to provide a silane-treated glass.

The protective film of the transferring material TR-1 for producing birefringence pattern was peeled off, and the substrate preheated to 105° C. for 2 minutes was laminated with the resultant at a roller temperature of 130° C., a linear pressure of 100 N/cm, and a conveying speed of 1.4 m/min, using a laminator (Lamic II type, manufactured by Hitachi Industries Co., Ltd.).

After lamination, a transferring material TR-1 for producing birefringence pattern was further laminated in the same method on the substrate after the temporary support thereon was peeled off. Care was given then to make the direction of slow phase axis of the previously laminated optically anisotropic layer approximately identical with that of the optically anisotropic layer later laminated. After lamination, the temporary support was peeled off to give a birefringent pattern builder BPM-6 according to the present invention carrying multiple optically anisotropic layers.

(Preparation of Retardation Pattern by Using an Exposure Mask Having Multiple Regions Different in Density)

BPM-6 was irradiated at an exposure intensity of 6.25 mW/cm$^2$ for 7.5 seconds by using M-3L mask aligner manufactured by Mikasa and a photomask I having four regions different in density. The photomask used then is shown in FIG. 8. The photomask I had four regions L to O different in density and anon-light-transmitting region (which is the black-colored portion in the figure). The transmittance of a UV light at λ=365 nm through each region is shown in Table 11.

TABLE 11

| Region | Transmittance/% |
| --- | --- |
| Region L (upper left) | 16.0 |
| Region M (upper right) | 28.0 |
| Region N (lower left) | 48.0 |
| Region O (lower right) | 80.0 |
| Non-light-transmitting region | 0.0 |

BPM-6 after exposure was baked in a clean oven at 230° C. for 1 hour to produce a retardation pattern BP-2. The results of measuring the retardation of the sample regions L' to O' corresponding to the regions L to O of the photomask are shown in Table 12, together with the transmittances of the photomask regions L to O.

TABLE 12

| Region | Mask transmittance/% | Retardation/nm |
| --- | --- | --- |
| Region L' (upper left) | 16.0 | 191.5 |
| Region M' (upper right) | 28.0 | 298.5 |
| Region N' (lower left) | 48.0 | 393.9 |
| Region O' (lower right) | 80.0 | 487.1 |
| Non-light-transmitted region | 0.0 | 3.3 |

As shown in the above, it is possible to prepare birefringence patterns having multiple regions different in retardation only by single exposure, by using an exposure mask having multiple regions different in density. The method is particularly useful when rapid production of the same birefringence pattern in a great amount is desired even if a complicated density mask is needed as the photomask.

Example 6

Preparation of Birefringence Patterns by Using Multiple Exposure Masks

BPM-6 was exposed to light through four photomasks II, III, IV and V different in patterns, one time, respectively. The mask patterns used are shown in FIG. 9.

Exposure was performed by using M-3L mask aligner manufactured by Mikasa at an exposure intensity of 6.25 mW/cm$^2$, and the exposure time period was altered according to the mask used. The exposure time period for each mask is shown in Table 13.

TABLE 13

| Mask | Exposure period/sec |
| --- | --- |
| Mask II | 1.2 |
| Mask III | 2.1 |
| Mask IV | 3.6 |
| Mask V | 6.0 |

BPM-6 after exposure was baked in a clean oven at 230° C. for 1 hour to produce a retardation pattern BP-3. The sample prepared is shown in FIG. 10. The positions of the regions P, Q, R and S on the sample corresponded to those of the openings of the photomasks II, III, IV and V, respectively. The results of measurement of the retardation of the regions P to S of the samples are shown in Table 14 with the photomasks corresponding to the regions and the exposure time periods with the photomasks.

TABLE 14

| Region | Photomask | Exposure period/sec | Retardation/nm |
| --- | --- | --- | --- |
| Region P | Mask II | 1.2 | 189.4 |
| Region Q | Mask III | 2.1 | 295.6 |
| Region R | Mask IV | 3.6 | 387.9 |
| Region S | Mask V | 6.0 | 499.4 |

In this way, it is possible to prepare birefringence patterns having multiple regions different in retardation by using multiple exposure masks and performing exposure while changing the exposure condition for each mask. The method is particularly useful, especially when subtle modification of exposure conditions for respective regions are desired.

Example 7

Preparation of Birefringence Patterns Having Black Matrix (Preparation of Coating Liquid KL-1 for Black Photosensitive Resin Layer)

The composition below was prepared, filtered through a polypropylene filter having a pore size of 0.2 µm, and the filtrate was used as coating liquid KL-1 for forming a black photosensitive resin layer.

B-5 was a copolymer of benzyl methacrylate and methacrylic acid, having a copolymerization composition ratio (molar ratio) of 78.0/22.0, and a mass-average molecular mass of 40,000.

| Composition of coating liquid for black photosensitive resin layer | (% by mass) |
|---|---|
| K pigment dispersion | 25.00 |
| Binder (B-5) | 2.43 |
| KAYARAD DPHA (trade name, manufactured by Nippon Kayaku) | 3.19 |
| Radical photopolymerization initiator (RPI-1) | 0.12 |
| Hydroquinone monomethyl ether | 0.002 |
| Megafac F-176PF (trade name, manufactured by Dainippon Ink & Chemicals Incorporation) | 0.04 |
| Propylene glycol monomethyl ether acetate | 15.58 |
| Methyl ethyl ketone | 53.59 |

The composition of the K pigment dispersion shown in Table is as follows:

| Composition of K pigment dispersion | (% by mass) |
|---|---|
| Carbon black (manufactured by Degussa, trade name: Special Black 250) | 13.1 |
| 5-[3-oxo-2-[4-[3,5-bis(3-diethylaminopropylaminocarbonyl)phenyl]-aminocarbonyl]phenylazo]-butyroylaminobenzimidazolone | 0.65 |
| Binder (B-4) | 6.72 |
| Propylene glycol monomethyl ether acetate | 79.53 |

(Preparation of Glass Carrying Oriented Film)

A nonalkali glass substrate was washed with a rotating brush of nylon hairs while a glass cleaner solution adjusted to 25° C. was sprayed by showering for 20 seconds, washed with pure water, and then, spin-coated with a polyimide-based oriented film-preparing coating liquid (trade name: SE-410, manufactured by Nissan Chemical Industries Co., Ltd.) at a rotation speed of 5000 revolutions per min. The substrate was heated in a substrate-preheating apparatus at 100° C. for 5 minutes, baked in a clean oven at 200° C. for 1 hour, and subjected to rubbing treatment, to give a glass carrying an oriented film.

(Preparation of Birefringent Pattern Builder BMP-7 Having Black Photosensitive Resin Layer)

The coating liquid LC-1 for optically anisotropic layer was coated on the oriented film-carrying glass described above with a wire bar coater and dried at a film-surface temperature of 90° C. for 2 minutes to thereby form a liquid crystal phase; ultraviolet ray was irradiated thereon in air by using an air-cooled metal halide lamp (manufactured by Eye Graphics Co., Ltd.) at 160 W/cm, so as to fix the orientation state and thus, to form an optically anisotropic layer having a thickness of 3.0 µm. The ultraviolet ray used was 100 mW/cm$^2$ illuminance in the range of UV-A (integrated value in the wavelength between 320 and 400 nm), and 80 mJ/cm$^2$ irradiation energy in the range of UV-A. The black-photosensitive-resin-layer-coating liquid KL-1 was coated and dried additionally thereon to thereby form a black photosensitive resin layer of 2.0 µm in thickness and give a birefringent pattern builder BMP-7.

(Preparation of Black Matrix)

The birefringent pattern builder BMP-7 having a black photosensitive resin layer was subjected to a pattern exposure from the black resin layer side by using M-3L mask aligner manufactured by Mikasa and an exposure mask having a lattice-like light-transmitting region. The illuminance of the ultraviolet ray used then was 25 mW/cm$^2$ in the UV-A region (as integrated in the wavelength region of 320 nm to 400 nm); the irradiation quantity was 2000 mJ/cm$^2$ in the UV-A region; and the distance between the exposure mask face and the photosensitive resin layer was adjusted to 100 µm. It is noted that the exposure to light was made from the black resin layer side, and thus, optically anisotropic layer was hardly exposed to light.

The photosensitive resin layer was then shower-developed at a conical nozzle pressure of 0.15 MPa by using a sodium carbonate-based developing solution (trade name: T-CD1, manufactured by Fuji Photo Film Co., containing 0.06 mol/L sodium bicarbonate and 0.06 mol/L sodium carbonate, 1% sodium dibutylnaphthalenesulfonate, an anionic surfactant, an antifoam, and a stabilizer), so as to form a black matrix of a lattice-shaped black resin layer on the surface of the birefringent pattern builder.

(Preparation of Birefringence Pattern BP-4 Having Black Matrix on the Surface)

In addition, the optically anisotropic layer formed on a birefringent pattern builder having black matrix on the surface was exposed to light through the openings of the black matrix. At that time, three kinds of openings X, Y and, Z different in exposure quantity depending on the positions of the openings were formed for comparison. The exposure was performed by using M-3L mask aligner manufactured by Mikasa, and the exposure intensities of the openings X, Y, and Z were respectively 10 mJ/cm$^2$, 40 mJ/cm$^2$, and 160 mJ/cm$^2$. After exposure, it was baked in a clean oven at 230° C. for 1 hour to give a birefringence pattern BP-4 having black matrix on the surface. The retardations after baking at regions of the prepared pattern corresponding to the openings different in exposure quantity were determined, and the results are shown in Table 15.

TABLE 15

| Openings | Exposure quantity/ mJ/cm$^2$ | Re (0)/nm |
|---|---|---|
| Openings X | 10 | 87.7 |
| Openings Y | 40 | 195.1 |
| Openings Z | 160 | 273.2 |

As described above, it is possible to produce birefringence patterns having openings different in retardation and a black matrix by applying the method according to the present invention. The presence of black matrix, which makes the difference between retardations of openings more distinctive, is advantageous in visually utilizing birefringence patterns.

REFERENCE SIGNS IN THE DRAWING

Figure 1:
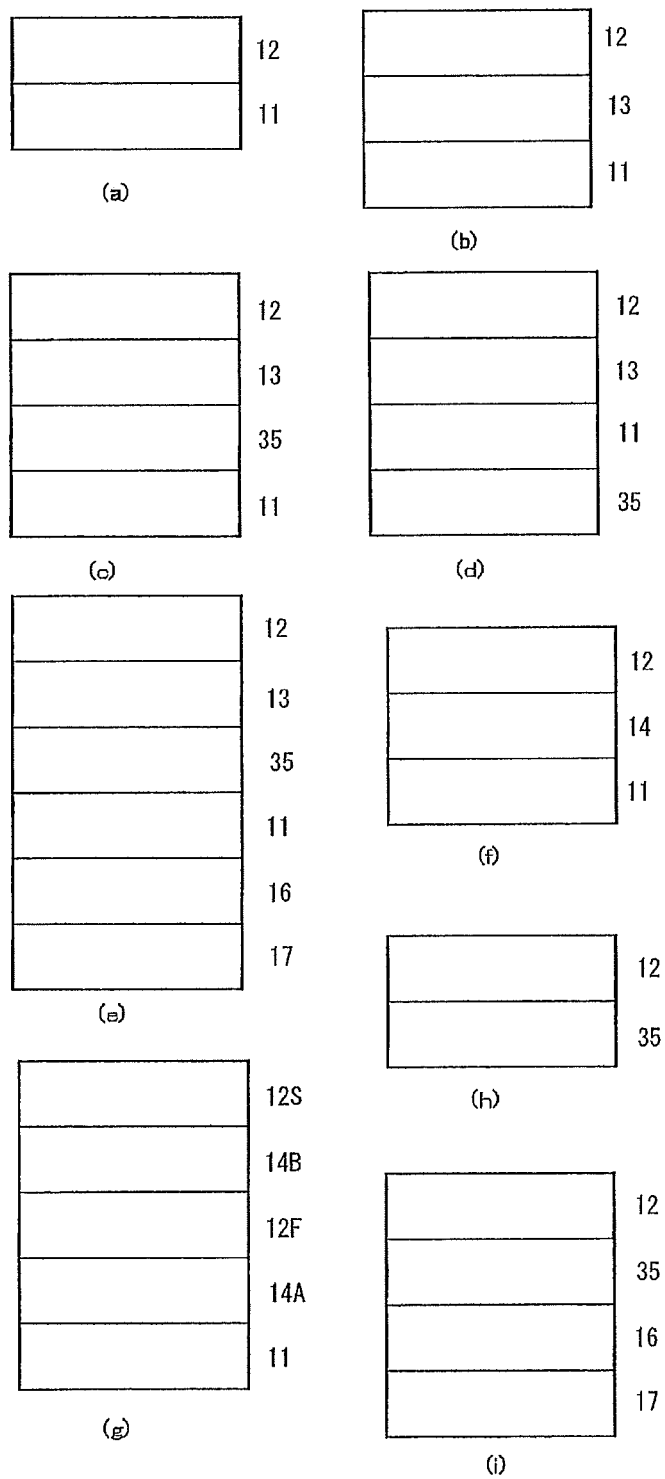
FIGS. 1(a) to 1(i) are schematic sectional views showing examples of the birefringence pattern builder.
Figure 2:
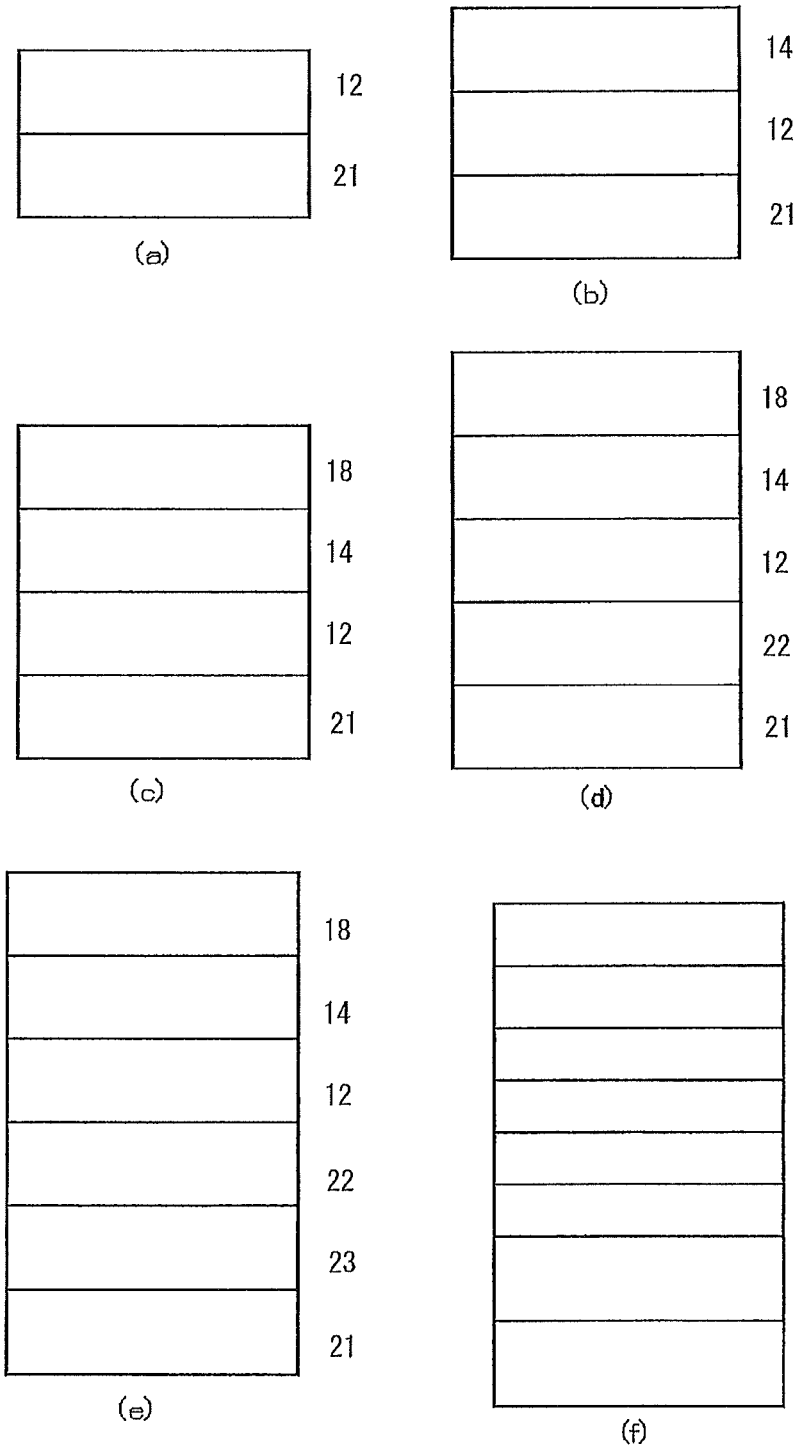
FIGS. 2(a) to 2(f) are schematic sectional views showing examples of the birefringence pattern builder which are used as a transferring material.
Figure 3:
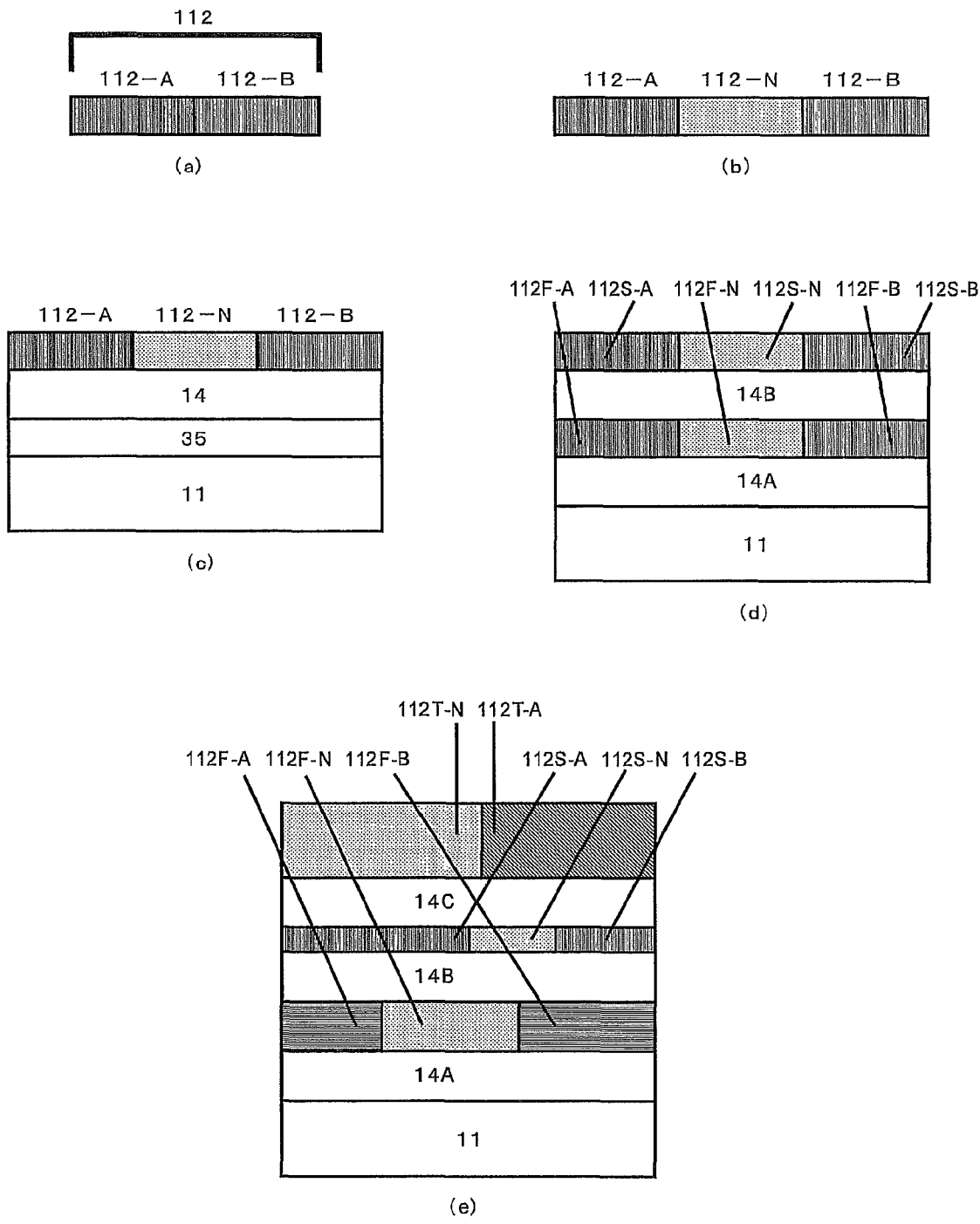
FIGS. 3(a) to 3(e) are schematic sectional views showing examples of patterned birefringent products which are obtainable by the method of the present invention.
Figure 4:
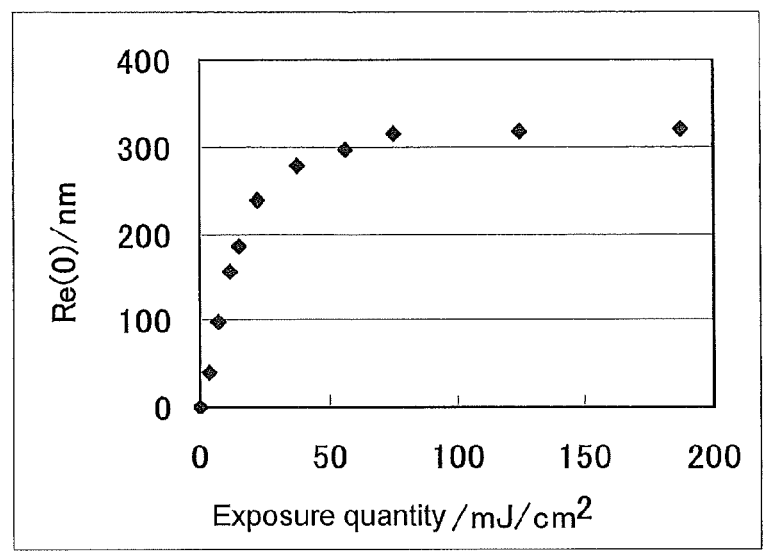
FIG. 4 is a graph showing the relationship between the exposure quantity and the retardation in an example in which a birefringent pattern builder is exposed to light at different exposure quantities.
Figure 5:
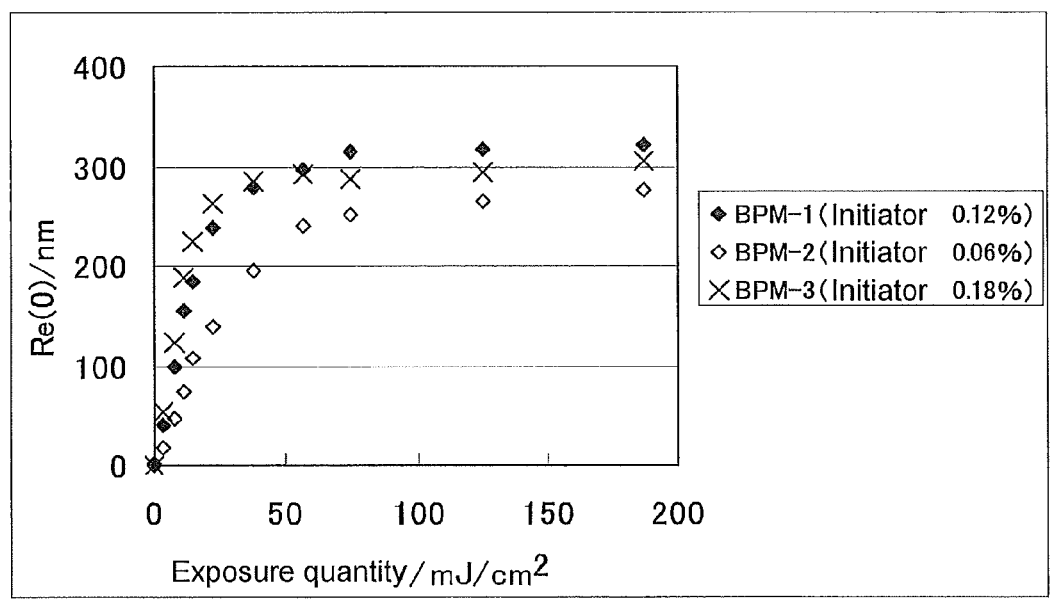
FIG. 5 is a graph showing the change caused by the amount of photopolymerization initiator in the relationship between the exposure quantity and the retardation in an example in which a birefringent pattern builder is exposed to light at different exposure quantities.
Figure 6:
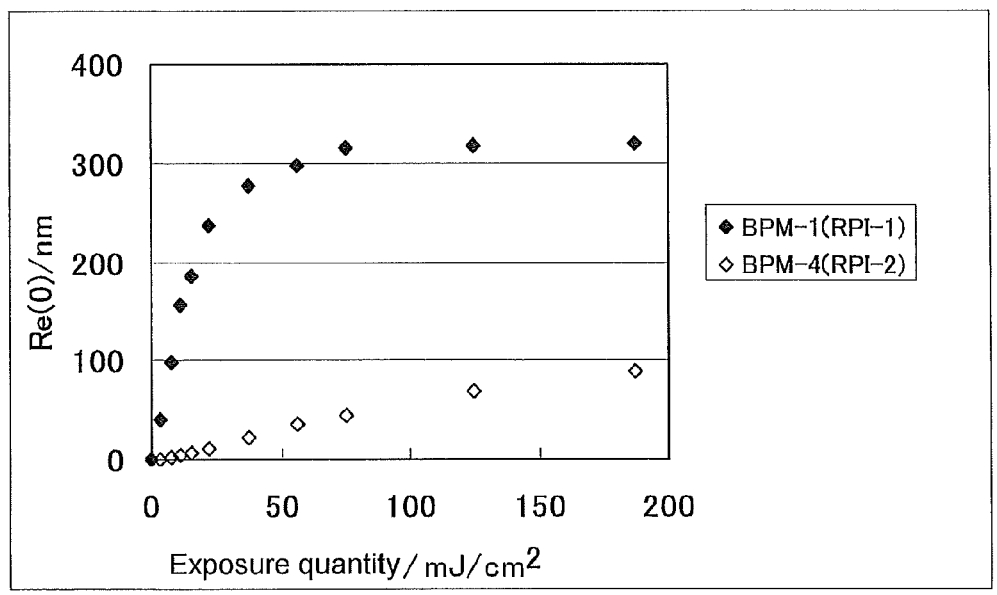
FIG. 6 is a graph showing the change caused by the kind of the photopolymerization initiator in the relationship between the exposure quantity and the retardation in an example in which a birefringent pattern builder is exposed to light at different exposure quantities.
Figure 7:
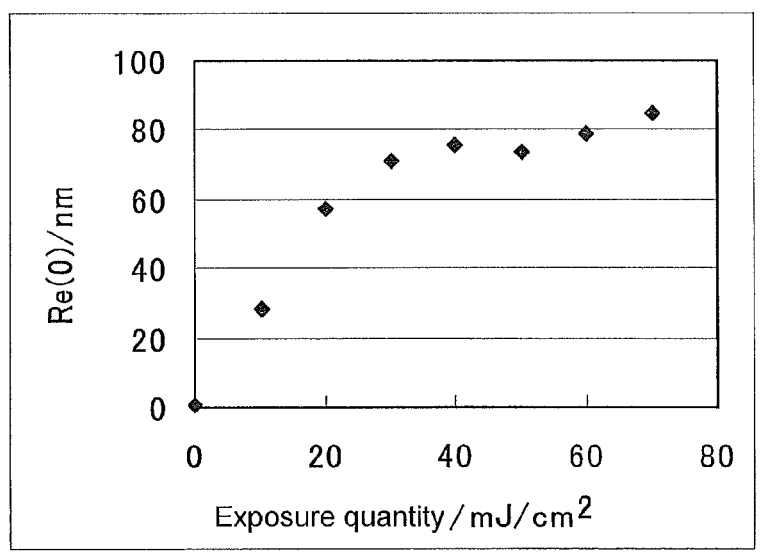
FIG. 7 is a graph showing the relationship between the exposure quantity and the retardation in an example in which a birefringent pattern builder is exposed to light at different exposure quantities.
Figure 8:
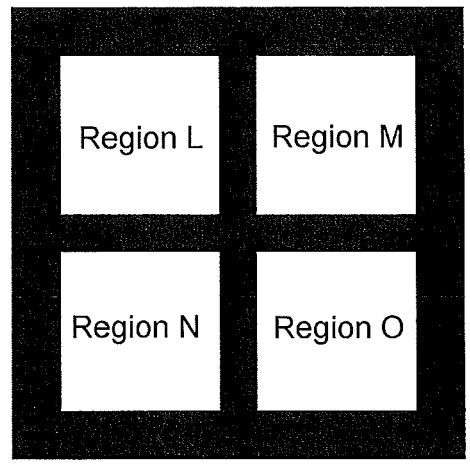
FIG. 8 shows the shape of the photomask I used in Example.
Figure 9:
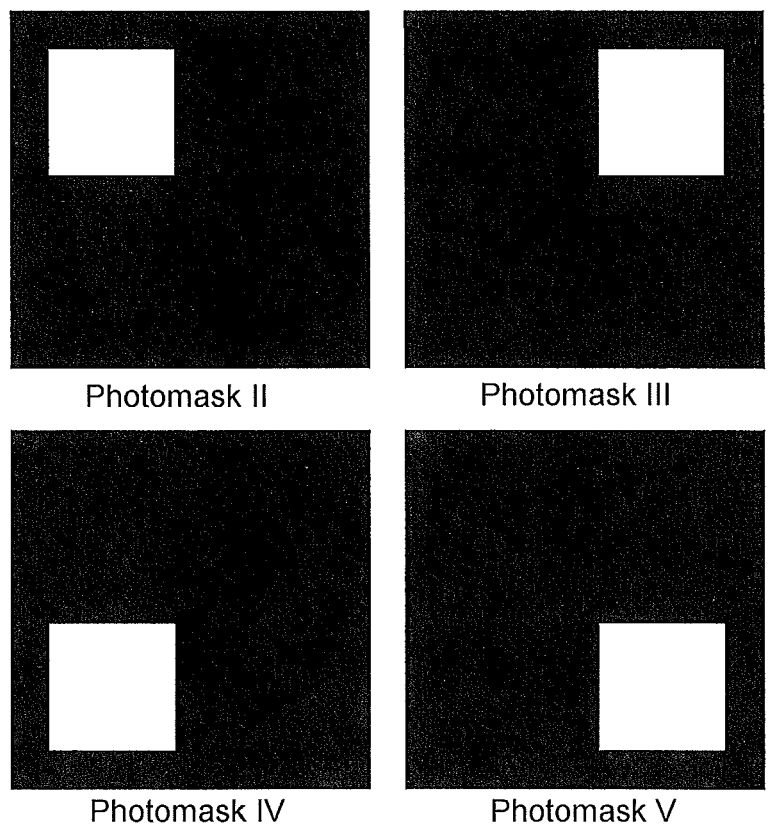
FIG. 9 shows the shapes of four photomasks II, III, IV, and V used in Example.
Figure 10:
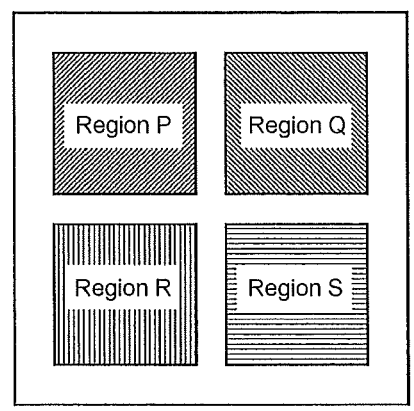
FIG. 10 is a diagram showing the regions different in retardation in a sample prepared by using four photomasks II, III, IV and V.

11 Support or substrate
12 Optically anisotropic layer
12F First optically anisotropic layer
12S Second optically anisotropic layer
13 Alignment layer (on support or substrate)
14 Adhesive layer for transfer
14A First adhesive layer for transfer
14B Second adhesive layer for transfer
14C Third adhesive layer for transfer
16 Post-adhesive layer
17 Delamination layer
18 Surface-protecting layer
21 Temporary support
22 Alignment layer (on temporary support)
22F First alignment layer on temporary support
22S Second alignment layer on temporary support
23 Dynamic property control layer
35 Reflective layer
112 Patterned optically anisotropic layer
112-A Patterned optically anisotropic layer (first light-exposed region)
112-B Patterned optically anisotropic layer (second light-exposed region)
112-N Patterned optically anisotropic layer (non-light-exposed region)
112F-A First patterned optically anisotropic layer (first light-exposed region of first layer)
112F-B First patterned optically anisotropic layer (second light-exposed region of first layer)
112F-N First patterned optically anisotropic layer (non-light-exposed region of first layer)
112S-A Second patterned optically anisotropic layer (first light-exposed region of second layer)
112S-B Second patterned optically anisotropic layer (second light-exposed region of second layer)
112S-N Second patterned optically anisotropic layer (non-light-exposed region of second layer)
112T-A Third patterned optically anisotropic layer (light-exposed region of third layer)
112T-B Third patterned optically anisotropic layer (non-light-exposed region of third layer)

Having described our invention as related to the present embodiments, it is our intention that the invention not be limited by any of the details of the description, unless otherwise specified, but rather be construed broadly within its spirit and scope as set out in the accompanying claims.

This non-provisional application claims priority under 35 U.S.C. §119(a) on Patent Application No. 2008-011170 filed in Japan on Jan. 22, 2008, which is entirely herein incorporated by reference.

The invention claimed is:

1. A method of producing a patterned birefringent product, comprising at least steps (I) to (III) in this order:
    (I) providing a birefringent pattern builder having an optically anisotropic layer containing a polymer having an unreacted reactive group, the optically anisotropic layer being obtained by coating with a solution containing a liquid crystalline compound having two or more types of reactive groups each of which having different polymerization condition, drying the thus-coated solution to thereby form a liquid crystal phase, and then applying heat or irradiating ionized radiation to the liquid crystal phase to thereby cause polymerization and fixation;
    (II) subjecting two or more regions of the birefringent pattern builder to patterned light exposure under exposure conditions that differ from each other in at least one of exposure intensity, exposure quantity, exposure time period, and exposure peak wavelength; and
    (III) heating a laminated structure obtained after the step (II) at 50° C. or higher and 400° C. or lower.

2. The method according to claim 1, wherein the exposure of two or more regions is performed by using an exposure mask having patterns different from each other.

3. The method according to claim 1, wherein the step (II) is carried out by single exposure by using an exposure mask having two or more regions showing transmission spectra different from each other.

4. The method according to claim 1, wherein the in-plane retardation at 20° C. of the optically anisotropic layer is 10 nm or more.

5. The method according to claim 1, wherein the liquid crystalline compound at least has a radically reactive group and a cationically reactive group.

6. The method according to claim 5, wherein the radically reactive group is an acrylic group and/or a methacrylic group, and the cationically reactive group is a vinyl ether group, an oxetanyl group, and/or an epoxy group.

7. The method according to claim 1, wherein the optically anisotropic layer is a stretched film.

8. The method according to claim 1, wherein the step is carried out by conducting transfer of a transferring material which has the optically anisotropic layer, to a target transfer material.

9. A product, which is obtainable from the method according to claim 1, wherein the change in retardation (phase difference) thereof after baking at 200° C. for 30 minutes is 10% or less.

10. A product used as mean of preventing forgery, which is obtainable from the method according to claim 1.

11. A product used as an optical element, which is obtainable from the method according to claim 1.

* * * * *